US006575757B1

(12) United States Patent
Leight et al.

(10) Patent No.: US 6,575,757 B1
(45) Date of Patent: Jun. 10, 2003

(54) COMPUTER BASED INSTRUMENTATION AND SENSING FOR PHYSICAL EXAMINATION TRAINING

(75) Inventors: Susan B. Leight, Bridgeport, WV (US); Roy S. Nutter, Jr., Morgantown, WV (US); Bratislav Matic, Fairfax, VA (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 09/922,452

(22) Filed: Aug. 3, 2001

Related U.S. Application Data
(60) Provisional application No. 60/223,195, filed on Aug. 4, 2000.

(51) Int. Cl.[7] .............................................. G09B 23/28
(52) U.S. Cl. ...................................................... 434/273
(58) Field of Search .............................. 434/262, 265, 434/266, 267, 268, 269, 270, 271, 272, 273, 274, 275

(56) References Cited

U.S. PATENT DOCUMENTS

| | | | |
|---|---|---|---|
| 4,001,951 A | 1/1977 | Fasse | 35/17 |
| 4,134,218 A | 1/1979 | Adams et al. | 35/17 |
| 4,655,716 A | 4/1987 | Hoevel | 434/267 |
| 4,867,686 A | 9/1989 | Goldstein | 434/267 |
| 5,853,292 A | 12/1998 | Eggert et al. | 434/262 |

FOREIGN PATENT DOCUMENTS

| | | | | |
|---|---|---|---|---|
| WO | WO 00/17838 | 3/2000 | | G09B/23/30 |

*Primary Examiner*—Henry C. Yuen
*Assistant Examiner*—Hyder Ali
(74) *Attorney, Agent, or Firm*—Steptoe & Johnson PLLC

(57) ABSTRACT

An interactive instrumented model for training lay persons and health care providers to perform effective physical examinations of anatomy. A solid-state sensing system, e.g., a tactile sensor pad, is combined with a model of human anatomy, e.g., a breast model, or a part of a patient to train individuals in the giving of proper physical examinations. The solid-state sensing system is external to the model or part and is in contact with an external surface of the model or part. The solid-state sensing system provides a computer system with multiple levels of pressure applied to the model or part, as well as with the position of each applied pressure to the model or part. The computer system displays the results of a physical examination of the model to the user.

51 Claims, 15 Drawing Sheets

| 0.98 | 0.98 | 0.93 | 0.87 | 0.87 | 0.87 | 0.87 | 0.87 | 0.87 | 0.93 | 0.98 | 0.98 |
|------|------|------|------|------|------|------|------|------|------|------|------|
| 0.98 | 0.93 | 0.87 | 0.87 | 0.82 | 0.82 | 0.82 | 0.82 | 0.87 | 0.87 | 0.93 | 0.98 |
| 0.93 | 0.93 | 0.87 | 0.87 | 0.82 | 0.77 | 0.77 | 0.82 | 0.87 | 0.87 | 0.93 | 0.93 |
| 0.93 | 0.93 | 0.87 | 0.87 | 0.82 | 0.77 | 0.77 | 0.82 | 0.87 | 0.87 | 0.93 | 0.93 |
| 0.98 | 0.93 | 0.87 | 0.87 | 0.82 | 0.82 | 0.82 | 0.82 | 0.87 | 0.87 | 0.93 | 0.98 |
| 0.98 | 0.98 | 0.93 | 0.87 | 0.87 | 0.87 | 0.87 | 0.87 | 0.87 | 0.93 | 0.98 | 0.98 |

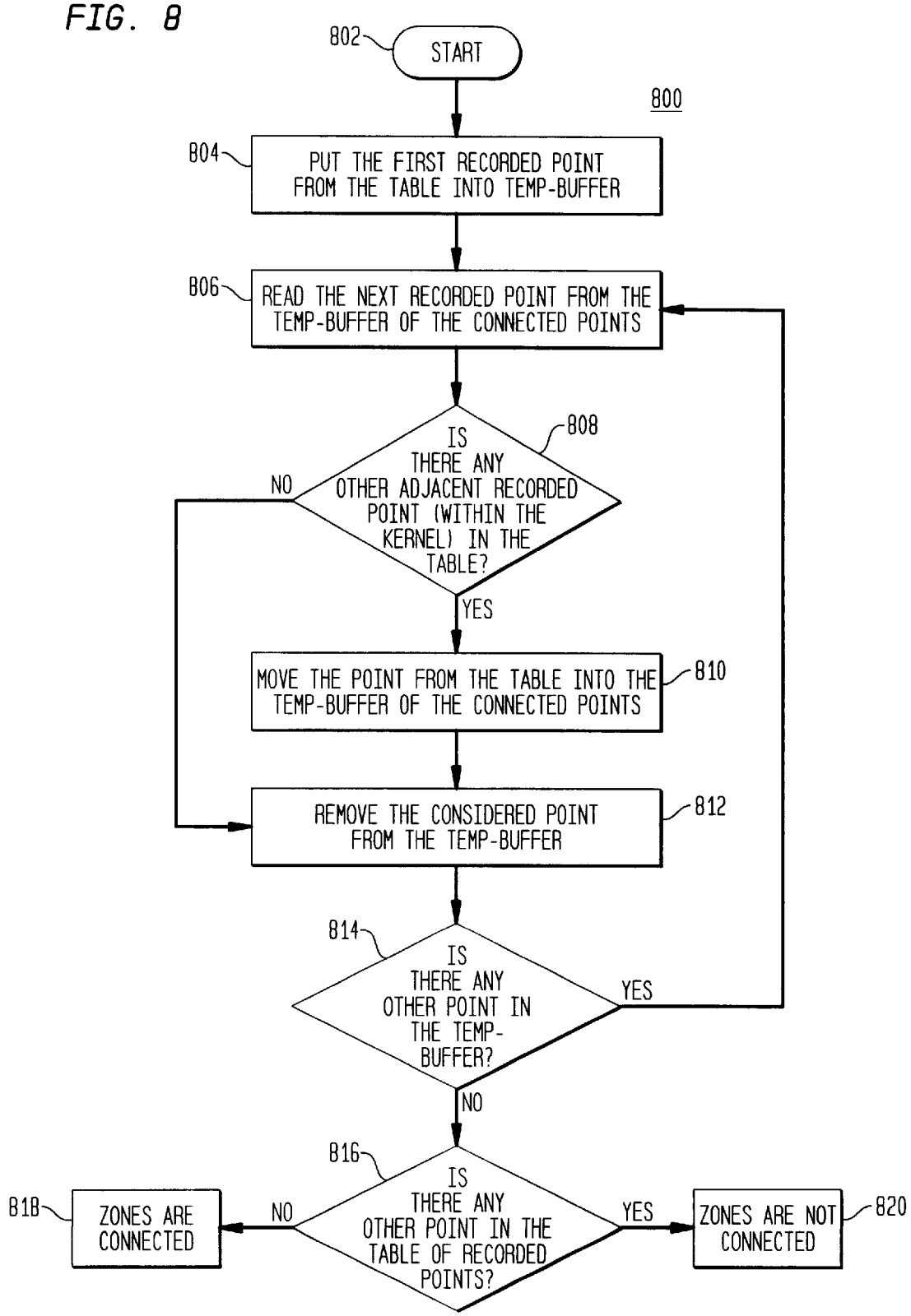

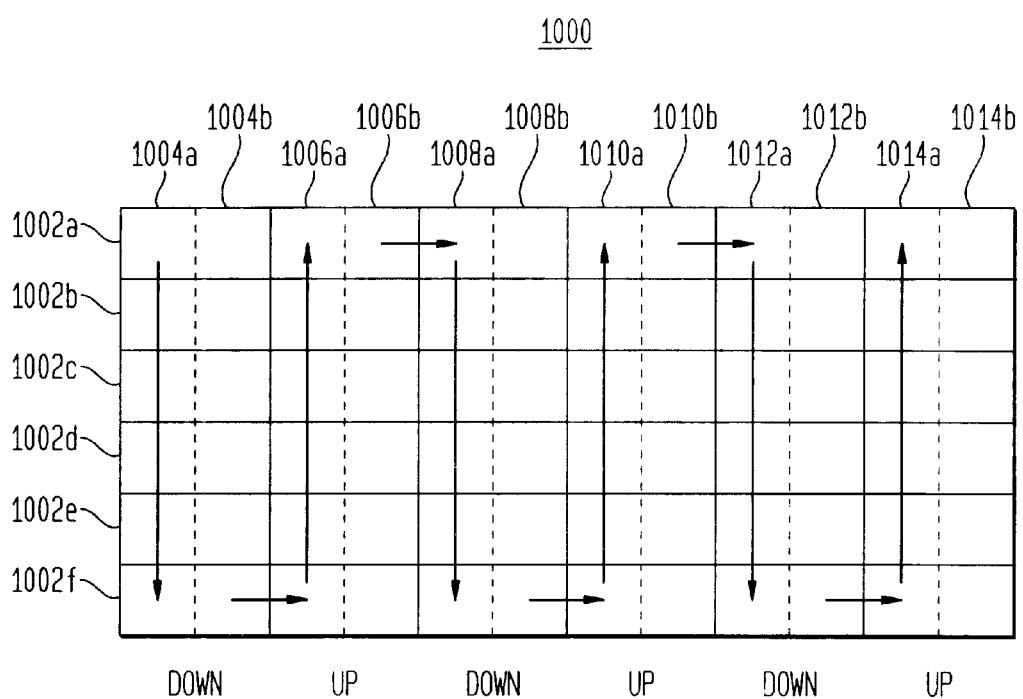

COMPUTER BASED INSTRUMENTATION AND SENSING FOR PHYSICAL EXAMINATION TRAINING

CROSS-REFERENCE TO RELATED APPLICATIONS

This application claims the benefit of application Ser. No. 60/223,195, filed Aug. 4, 2000.

BACKGROUND OF THE INVENTION

1. Field of Technology

The present invention relates to interactive instrumented models for physical examination training, and more specifically, to an interactive instrumented model of human anatomy in communication with a computer system for training persons to perform a competent and thorough physical examination.

2. Related Art

Medical science has experienced a technological explosion over the last century. Significant advances include discoveries relating to medical imaging, such as x-rays, computed tomography (CT), magnetic resonance imaging (MRI), positron emission tomography (PET) and ultrasound. These discoveries allow healthcare professionals to see and examine internal body parts without performing invasive procedures, such as surgery. This information often provides basic biomedical and anatomical information that provides new knowledge that may allow early detection and diagnosis of diseases.

While these technological advances have made significant contributions to the quality of healthcare in general, they suffer from the drawback of being very expensive, and therefore not available for all patients, especially those without medical insurance. For example, CT scans often cost $700 to $800, and the cost of MRIs and PET scans often exceeds $1000. The expense of performing these tests is an even bigger drawback in light of present day managed care systems with their ever-increasing concern for the bottom line.

In response to the concern for saving healthcare dollars, increased emphasis has been placed on disease prevention and early detection. Many cancers previously thought to be virtually untreatable, such as prostate, testicular, and breast, have promising prognoses when detected in their early stages. In addition, various diseases can often be detected and treated in their early stages upon proper physical examination. For example, palpation of the spleen, liver, and lymph nodes can often lead to the detection of an abnormality, i.e., enlargement, tenderness, etc. Aortic aneurisms can sometimes be detected by the skilled practitioner by palpating the mid-line of the belly, and many childhood cancers present themselves as mass lesions in the belly. For the aforementioned reasons, and in light of the often prohibitory cost of modern imaging techniques, there is an ever-increasing need for healthcare clinicians with good physical diagnosis skills.

While there are obvious advantages to having good physical diagnosis skills, unfortunately teaching these skills is often very difficult. There are various reasons for the difficulties, one of which is the desire and need to become skilled at using the new technologies. Additionally, there is often a shortage of individuals willing to be repetitively examined by students trying to hone their clinical skills. In an effort to overcome this problem, manikins or anatomically correct models, are often used as tools for teaching physical diagnosis skills. Unfortunately, these models are often unrealistic, and provide little or no feedback to the practitioner as to the effectiveness of his or her examination. Therefore, there is a need in the art for a realistic training device that provides instant feedback to the user when performing physical examinations.

In addition to training healthcare professionals, it is also increasingly important to train lay persons to perform self-examinations. Public awareness has been raised as to the importance of performing self breast exams and testicular exams, however there is little in the way of teaching proper techniques. In two such areas where early detection is key, the effectiveness of the self-exam is diminished when the individual uses improper technique because small nodules indicative of early disease often go undetected. Therefore, there is a further need for a method and apparatus for teaching non-medical personnel how to properly perform self-examinations.

In addition to the need for self-contained training systems, there is a need for an instrumented training system that can be adapted and used with existing training models of anatomy. For example, there are numerous commercially available, non-instrumented, breast models that are used for practicing breast examinations. Therefore, there is a need for an instrumented modeling system that can be adapted to be used with conventional models.

In U.S. Pat. No. 4,134,218 to Adams, et al., a breast cancer detection training system is disclosed that combines a breast model with an electronic training apparatus. This system has many disadvantages, among which is that the mechanical means for sensing pressure is embedded within the model and that the system is not capable of distinguishing between different levels of pressure applied to a model. In addition, the system is not capable determining the path of the user's search pattern, but rather can only detect the points on the model that were searched. Therefore, there is still a need for an instrumented model system that has a sensing mechanism external to a model, can detect and report on multiple levels of applied pressure, and trace a user's path through an examination.

SUMMARY OF THE INVENTION

A solid-state sensing system, such as a tactile sensing system, is used in conjunction with a physical model of a part of the human body or an actual body part of a patient to serve as an input device into a computer system. Upon application of pressure by a user during a physical examination of the model or part of anatomy, the sensing system detects the level and location of the pressure and sends it to a computer system. The computer system is programmed to accept these inputs and interpret them for display to the person being trained and to any associated instructor for evaluation of the physical examination.

The instrumented breast model system (IBMS) of the present invention was developed to provide the necessary training to lay women and health care providers for the early detection of breast cancer. The IBMS uses a silicone breast model along with a solid-state sensing system and data acquisition modules to collect data on examination performance, e.g., finger placement and palpation level (none, light, medium, and deep). This data is evaluated, and feedback regarding the user's performance is presented to the user in an easily readable graphical format. The IBMS is user-friendly so that anyone who is literate and can use a computer mouse is able to be instructed using this learning system.

An aspect of the invention is an instrumented model system for training a person on performing a physical examination, including a model of a part of anatomy or an actual part of a patient, a means for detecting two to more levels of pressure and a position of each level of pressure applied to the model or patient during an examination, and a means for reporting the levels of pressure and the position of each level of pressure during the examination of the model or patient.

Another aspect of the invention is a method for training a person in giving a physical examination, including the steps of (a) placing a solid-state sensing system in contact with an external surface of a model or part of human anatomy; (b) applying different levels of pressure to one or more locations on the model or part of human anatomy; (c) recording one or more levels of the pressure at each location on the model or part where pressure is applied in step (b); (d) recording one or more positions of the one or more levels of pressure applied against the model or part; and (e) displaying the levels of pressure and the positions of the levels of pressure to the person as an evaluation of his/her examination of the model or part.

Another aspect of the invention is an instrumented model system, including a tactile sensing system, an exterior surface of a model of human anatomy, and a means for responding to pressure applied to the exterior surface of the model of human anatomy.

An advantage of the invention is that it provides a life-like model for practicing self-examinations that provides instant and accurate feedback regarding the locations and amounts of pressure applied during the examination.

Another advantage of the invention is that the sensing system requires little or no movement of the sensors.

Another advantage of the invention is that it evaluates a user's risk factors for developing breast cancer based on her personal information and medical history.

Another advantage of the invention is that it can be used with any conventional model or with an actual patient.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

FIG. 5: A block diagram of weights assigned to the sensors of a sensor pad;

FIG. 8: A block diagram showing a search algorithm for determining the zones of connectivity;

FIG. 10: A block diagram showing the arrangement of vertical strips and assigned directions;

DETAILED DESCRIPTION OF THE PREFERRED EMBODIMENTS

Figure 1:
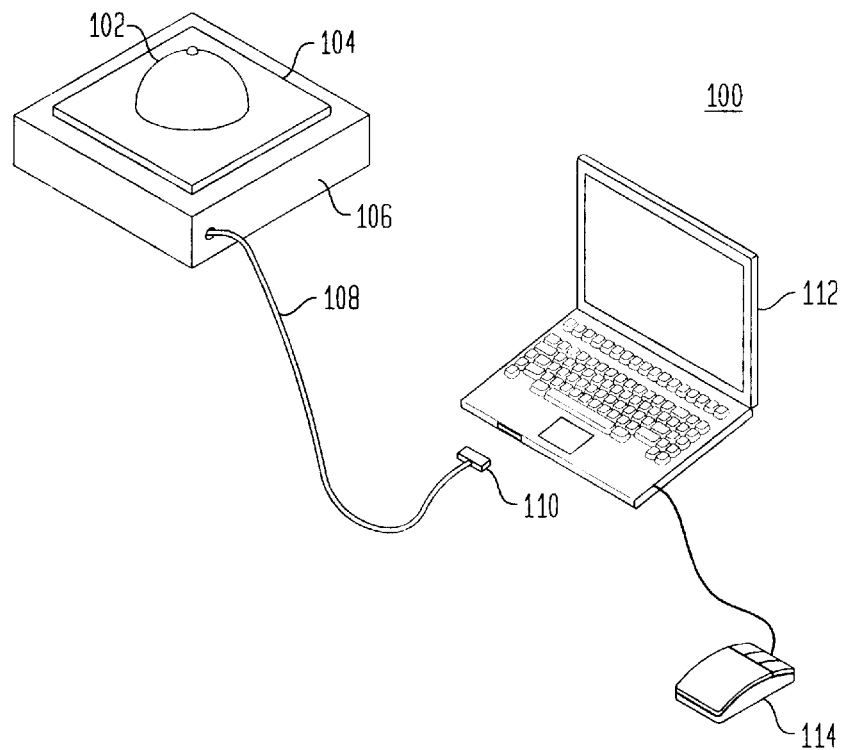
FIG. 1: A perspective diagram of an instrumented breast model system.

A. Overview of the Preferred Sensing System

An instrumented model system (IMS) of the present invention combines a tactile sensing system with an exterior surface of a model of human anatomy or an actual part of a patient. The preferred sensing system is a solid-state sensing system which does not rely on conventional electro-mechanical principles, but rather has no, or negligable, movement of sensors. These sensing systems include, but are not limited to, the following types of systems: fiber-optic based, pressure sensitive, smart fabric called Kinotex purchased from Tactex Controls, Inc, pressure sensitive piezoelectric polymer materials, and capaciflector options to name only a few (collectively, "sensing material(s)"). As a palpation, or pressure, is applied to any of these solid-state sensing materials, the sensing material generates accurate pressure data corresponding to the amount of displacement detected. These sensing material also are capable of detecting and generating pressure data that shows multiple levels of displacement, e.g., light, medium, and deep. In addition, some of these sensing materials, e.g., smart fabrics, can provide position data indicating the location of a detected palpation.

When used with a model of human anatomy or with a part of a patient, a sensing material is placed under, over, or around the model or part. Alternatively, the model can be manufactured of the solid-state sensing system. Upon the application of a palpation to the model or part, the sensing material detects the position and intensity of the palpation which is reported back to the user.

In the present invention, the preferred sensing material is a tactile sensor pad that is commercially available from Tactex Company. The tactile sensor pad is a sheet of deformable polymer foam, covered with a protective membrane, of a predefined size and shape which is generally square or rectangular in shape, but can be any size and shape. A plurality of sensors are embedded within the polymer foam. The sensors can be arranged and configured within the polymer foam in any predefined pattern, such as to optimize the coverage of the shape of the model being used, but the preferred arrangement is a matrix of rows and columns. Each sensor in the tactile sensor pad operates on the principle of deformation of an optical integrating cavity.

That is, the tactile sensor pad detects any applied palpation and registers the palpation as a pressure that deforms the polymer foam. Deformation of the polymer foam affects the changes in the optical properties of the foam which is detected by a simple optical transducer.

A fiber optic cable brings a generated signal from an optical LED to a local area in the polymer foam, resulting in an illuminated cavity within the polymer foam. Deformation of this cavity upon an applied palpation affects the proportional change of illumination energy intensity. A second fiber optic cable receives the optical signal and sends it to a photodiode. The change in the illumination energy intensity is proportional to the level of electrical signal generated from the output of the photodiode. This is how the change in illumination energy intensity is detected and measured within the tactile sensor pad. In operation, the tactile sensor pad of Tactex is capable of sensing pressures from as low as 0.1 kPa (0.01 psi) to over 200 kPa (25 psi) and sensing deformations as small as 0.025 mm (0.001 inches) to many mm/inches.

The sensors of a tactile sensor pad are coupled to remote electronics via optical fibers. The fibers are chemically inert and are immune to EMI. The signals from the optical transducers are multiplexed and collected by a microcontroller, which are then communicated to the outside world through a conventional RS-232 communication link. A software system of the present invention receives the signals as input, and analyzes and translates them into a format that is easily read and understood by a user.

The present invention is described in terms of an instrumented breast model system (IBMS) for convenience purpose only. However, it is readily apparent to one of ordinary skill in the relevant art to use the present invention with alternative models of human anatomy or with an actual body part of a patient. It also would be readily apparent to one of ordinary skill in the relevant art to use any conventional and commercially available model with a solid-state sensing system and computer system of the present invention.

B. Instrumented Breast Model Hardware

Figure 2:
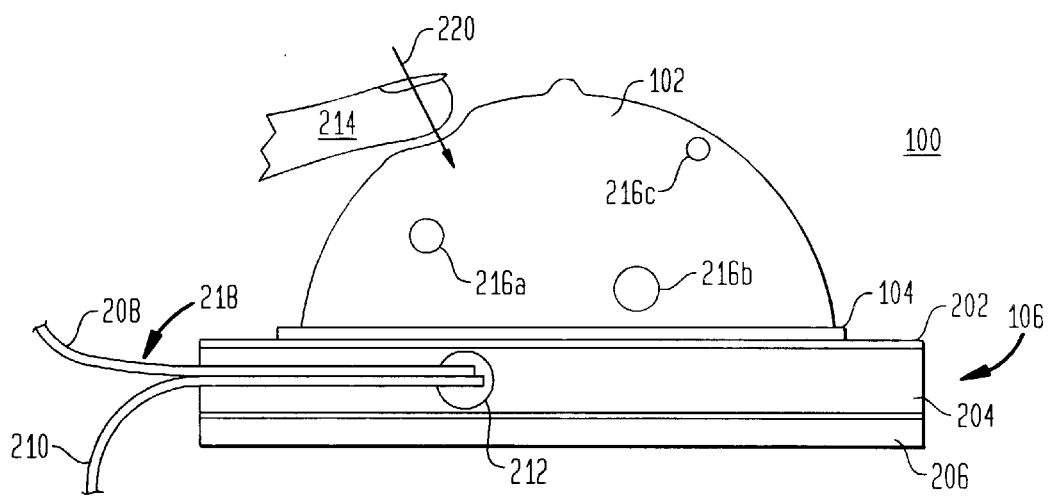
FIG. 2: A cross-sectional view of the instrumented breast model system.

FIGS. 1 and 2 illustrate an instrumented breast model system (IBMS) 100 of the present invention. The IBMS 100 comprises a breast model 102, attached to an optional base 104, having an anatomically correct shape and life-like feel. The preferred breast model 102 is filled with silicone and molded to give an impression and a physical sensation that are as close as possible to nature during an examination. A breast model 102 also can vary in nodularity which is the texture of the internal breast tissue. In addition, artificial breast lumps 216a–c may be implanted within a breast model 102 to be used during the training process. The breast lumps 216a–c vary in size and location within the breast model 102, so that a user must use different levels of palpation to locate the breast lumps 216a–c. The preferred breast model 102 is a commercially available model from Mammacare.

The sensor pad 106 is a tactile sensor pad commercially available from Tactex Company. In preferred embodiment, the sensor pad 106 is generally square in shape and is about 3/16 of an inch thick. As described above, the preferred sensor pad 106 comprises a foam layer 204, e.g., an open cell urethane foam, sandwiched between a protective membrane 202 and a mechanical substrate 206. A plurality of sensors 218 are embedded within the foam layer 204, wherein each sensor 218 comprises a first fiber optic cable 208 and a second fiber optic cable 210. In the preferred embodiment, there are 72 sensors 218 embedded within the foam layer 204 and are arranged in a matrix configuration of six rows and twelve columns. The first fiber optic cable 208 brings a generated signal from an optical LED to a local area of the foam layer 204, which generates an illuminated cavity 212 within the foam layer 204. The second fiber optic cable 210 receives the optical signal and sends it to a photodiode. A microcontroller in the sensor pad 106 determines any change in the illumination energy intensity, such as a change resulting from a palpation 220 from one or more fingers 214, and transmits the change in intensity and the position of the sensor 218 within the foam layer 106 to a computer system 112 via a communication link 108 having an RS-232 connector 110.

C. Instrumented Breast Model Software

Figure 3:
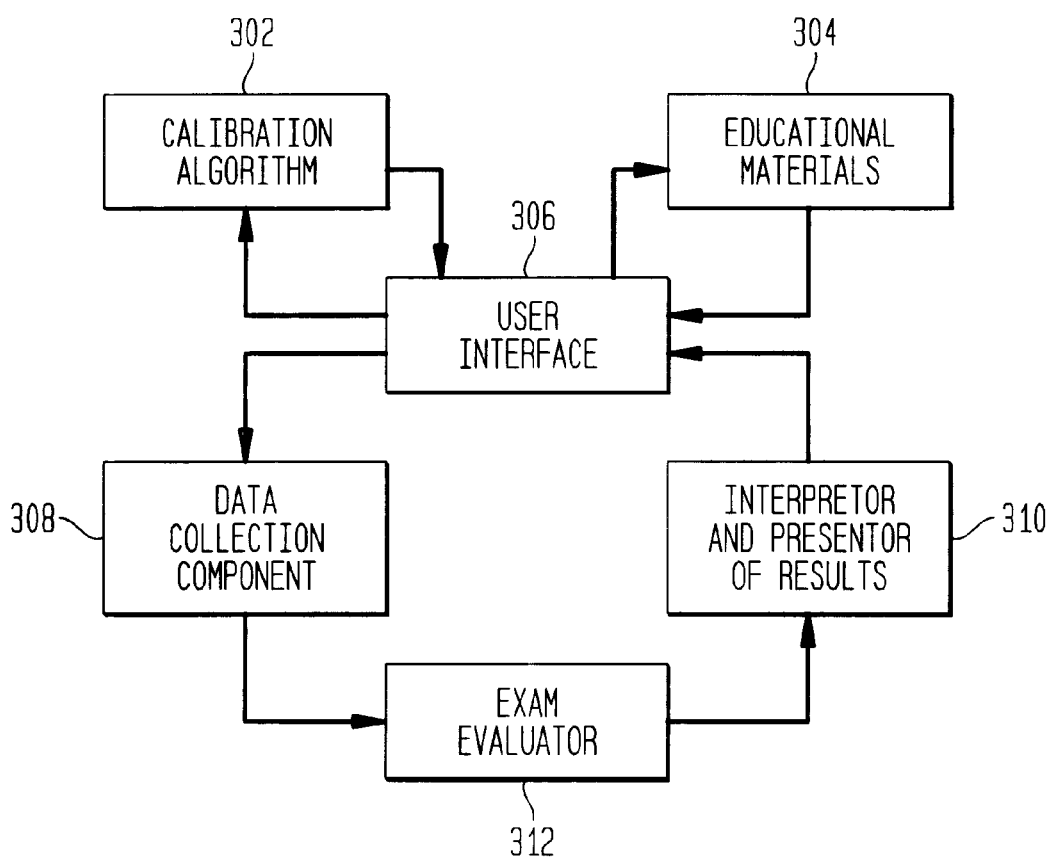
FIG. 3: A block diagram showing the software components of the instrumented breast model system.

FIG. 3 is a block diagram showing the six (6) components of the IBMS software 300 executing in the computer system 112: a calibration algorithm 302, educational materials 304, e.g., an instructional video and presentation, a user interface 306, a real time data collection component 308, an interpreter and presenter of results 310, and an exam evaluator 312. The IBMS software 300 integrates these software components into the IBMS system 100 to provide a very efficient and user friendly interface.

Figure 4:
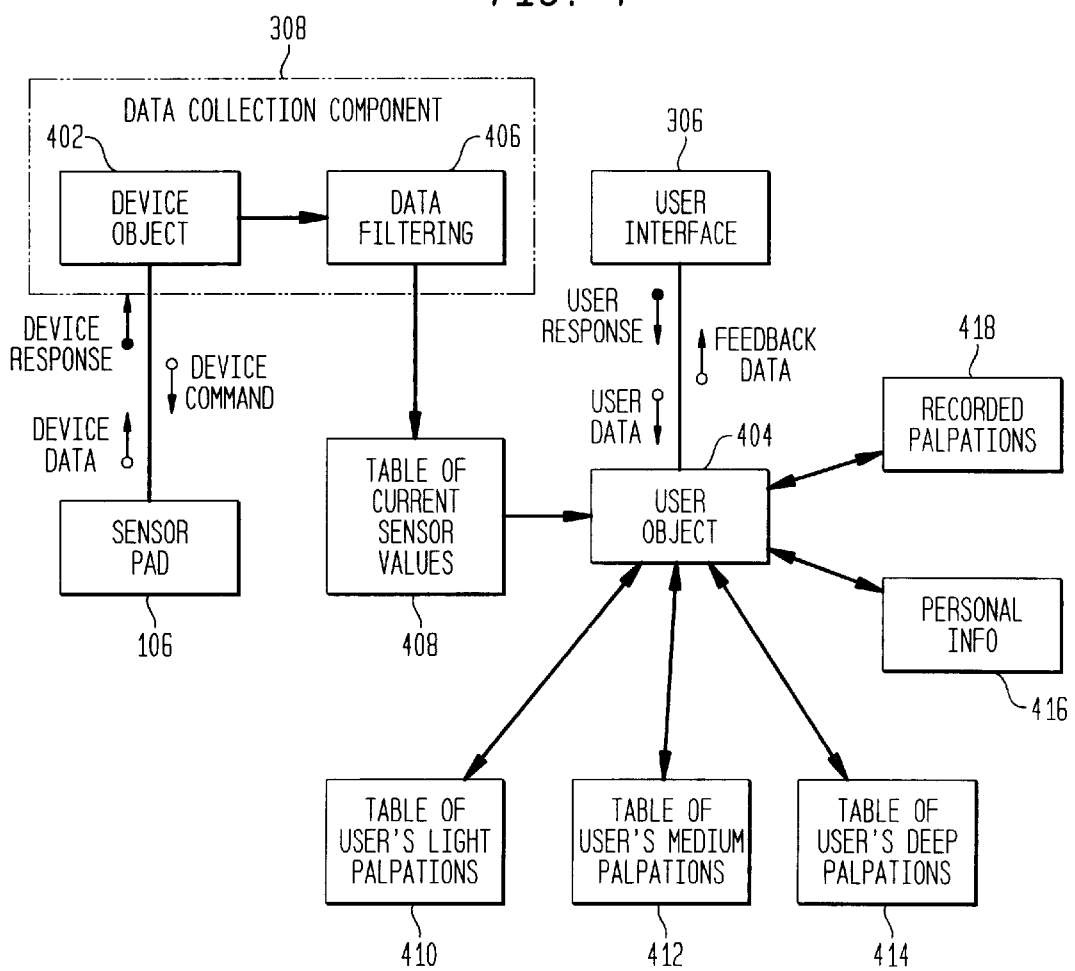
FIG. 4: A block diagram showing the data flow between objects of the software of the instrumented breast model system.

To further configure the IBMS software 300, the IBMS software 300 has been organized into two objects: a device object 402 and a user object 404. See FIG. 4 which is a block diagram showing the data flow between the device object 402 and the user object 404. The device object 402 manages the sensor pad 106 and all data received therefrom and sent thereto. Specifically, the device object 402 incorporates the data collection component 308 which receives the device data and device response in real-time. The received data is filtered by a data filtering component 406 and stored into a table of current sensor values 408. This filtering process is described in greater detail below. The device object 402 accomplishes its tasks by controlling the sensor pad 106 through various device commands. Possible device commands include, but are not limited to: device identification, type of command (create device, delete device, device information, is device connected?, start sending device data, stop sending device data, get normal data), wait time, and compression type.

The user object 404 manages the interface and communication between a user and the IBMS 100. Specifically, the user object 404 incorporates the calibration algorithm 302, educational materials 304, the exam evaluator 312, and the interpreter and presentor of results 310, all of which are available to the user via the user interface 306. The preferred user interface 306 is a graphical user interface (GUI) for input and output. For convenience purpose only, the user interface 306 is based on the use of a mouse 114 and "point and click" operations. It would be readily apparent for one of ordinary skill in the relevant art to use a different means of user input, e.g., pressure sensitive screen, light pen, keyboard, etc.

D. IBMS Operation

Figure 11:
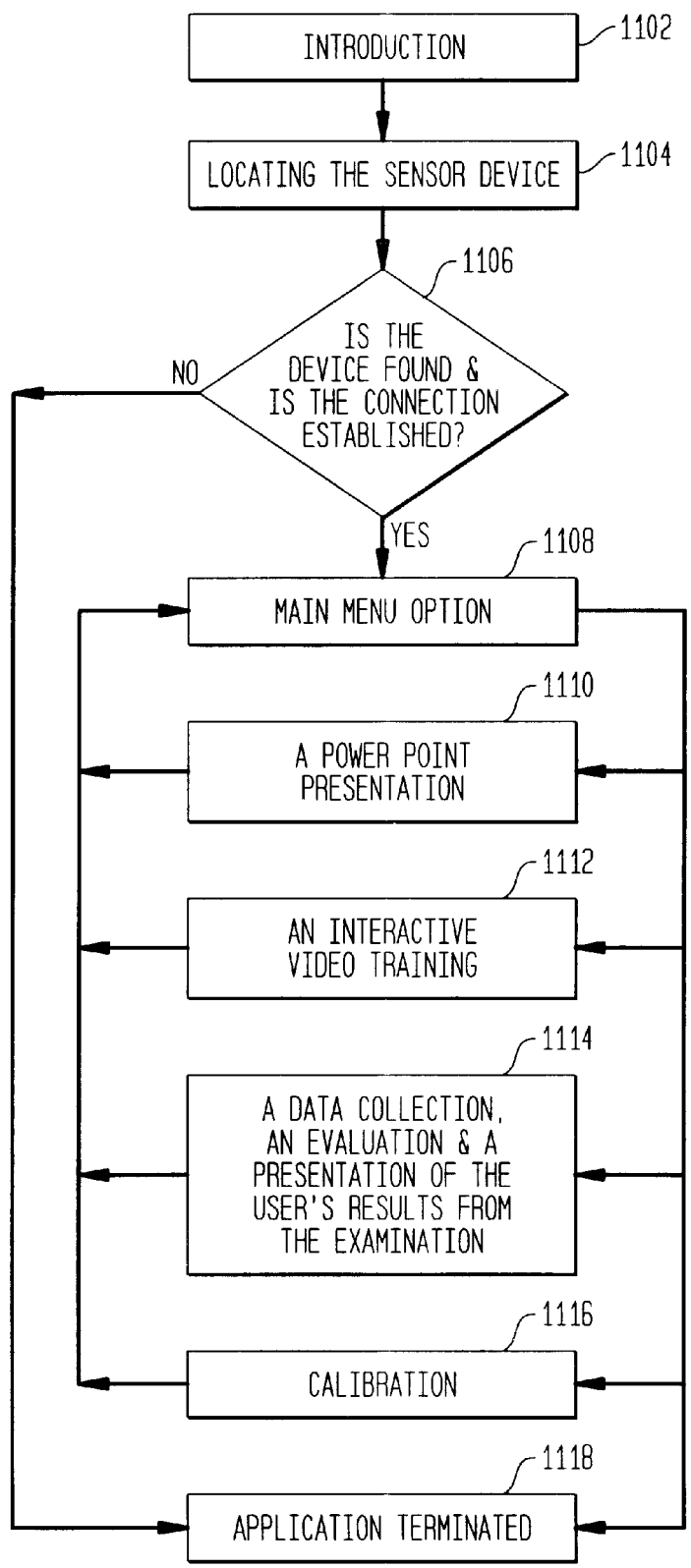
FIG. 11: A block diagram showing the system operation.

The overall operation of the IBMS Software 100 is shown in FIG. 11. Upon activation by a user, the user object 404 of the IBMS software 300 provides an introduction 1102 to the user. After the introduction 1102, the user object 404 proceeds to step 1104 and attempts to locate a sensor pad 106 and proceeds to step 1106. In step 1106, the user object 404 communicates with the device object 402 to determine whether the sensor pad 106 is found and if a valid connection is established. If a valid connection exists, the user object 404 proceeds to step 1108 and displays a main menu of options to the user which is described in greater detail below. If a sensor pad 106 cannot be located or a valid connection does not exist, the user object 404 informs the user about the problem(s) and proceeds to step 1118 wherein it terminates the user's session.

Returning to step 1108, the user object 404 displays the main menu to the user wherein the user has five options: view a presentation on breast cancer (step 1110); participate in an interactive video training session (step 1112); perform a breast examination and review the results (step 1114); calibrate the sensor pad 106 (step 1116); and terminate the application or user's session (step 1118). Upon selection of any option, except the option to terminate in step 1118, the user may end her selection and return to the main menu in step 1108. In addition, the main menu of the present invention is presented in these terms for convenience purpose only. It would be readily apparent to one of ordinary skill in the relevant art to design a different user interface having different options available to a user.

When the user selects to view a presentation on breast cancer, step 1110, the user object 404 presents the user with educational materials 304 explaining the methods used in breast examination for early detection and the proper use of the IBMS 100. In the preferred embodiment, the presentation is a tutorial that is divided into three sections: information on breast cancer and detection methods, techniques and search patterns used in breast examination, and a user's manual for use of the IBMS 100 of the present invention.

The first section of the tutorial presents information on breast cancer and the methods used in the detection of breast cancer. The development of breast cancer is described through three stages of breast lump progression (localized, regional, and distant). The risk factors for developing breast cancer are presented in order to show the importance of breast examination in early detection of the disease. Three methods are used in early detection of breast cancer: mammography, clinical breast examination, and breast self-examination. Each of these methods is discussed and screening recommendations are given.

The second section of the tutorial presents examination techniques and search patterns on the IBMS 100. Examination techniques include: correct use of the fingers for palpations, three palpation levels at each site and description of the vertical strip search pattern as the most effective search pattern in the breast examination. This section concludes with an overview of the components in the breast examination.

The third section of the tutorial explains how to operate the IBMS 100. The IBMS 100 is described in terms of the user interface 306 and the available selections and function available from the display menus.

When the user selects to participate in an interactive video training session, step 1112, the user is forwarded to a video menu that contains a list of topics in the educational materials 304 that are available on video. The user selects her choice of video, and a corresponding video fragment is opened and presented through a commercially available multi-media interface such as Windows Media Player from MicroSoft. The user may stop the video fragment at any time and return to the main menu in step 1108. The operation of a training video is shown in FIGS. 12 and 13.

Figure 12:
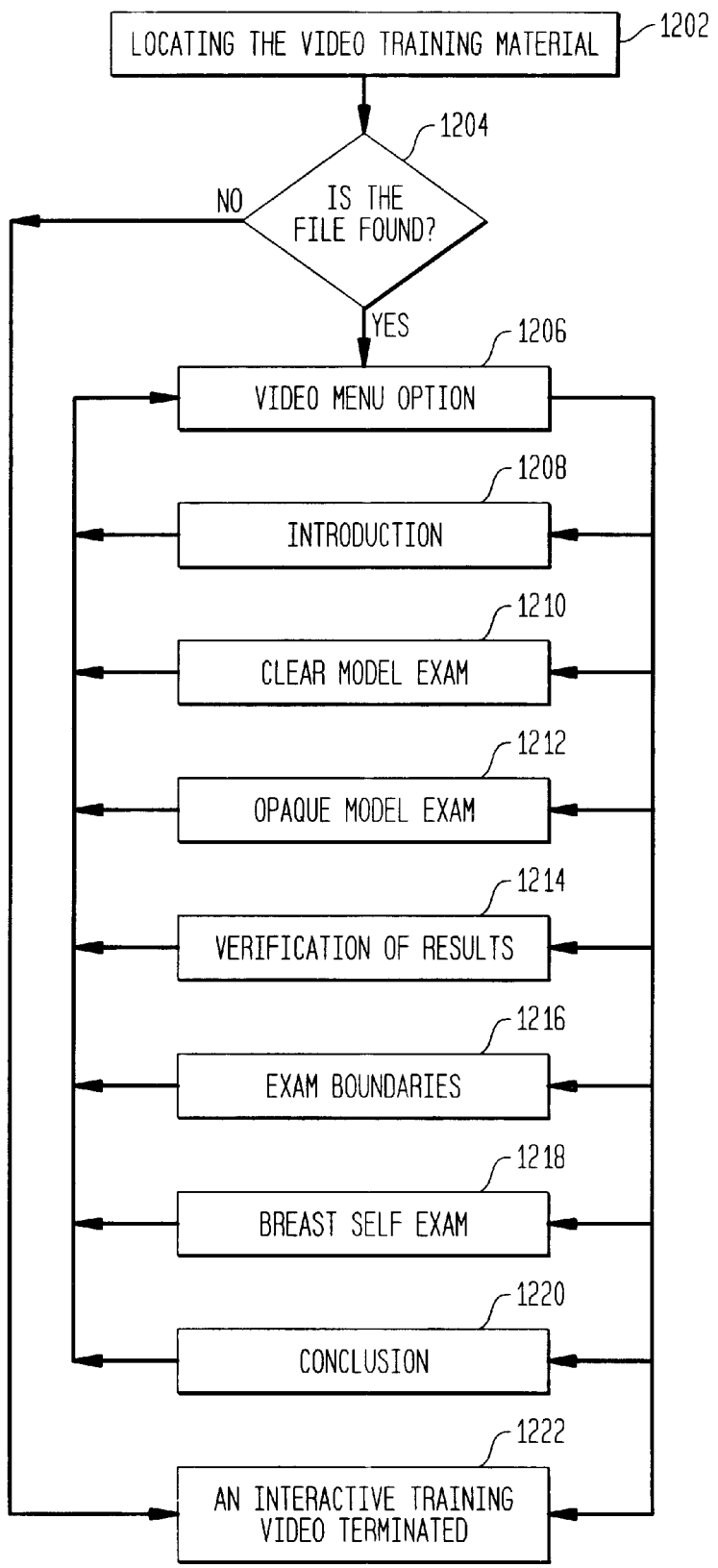
FIG. 12: A block diagram showing a training video state diagram.
Figure 13:
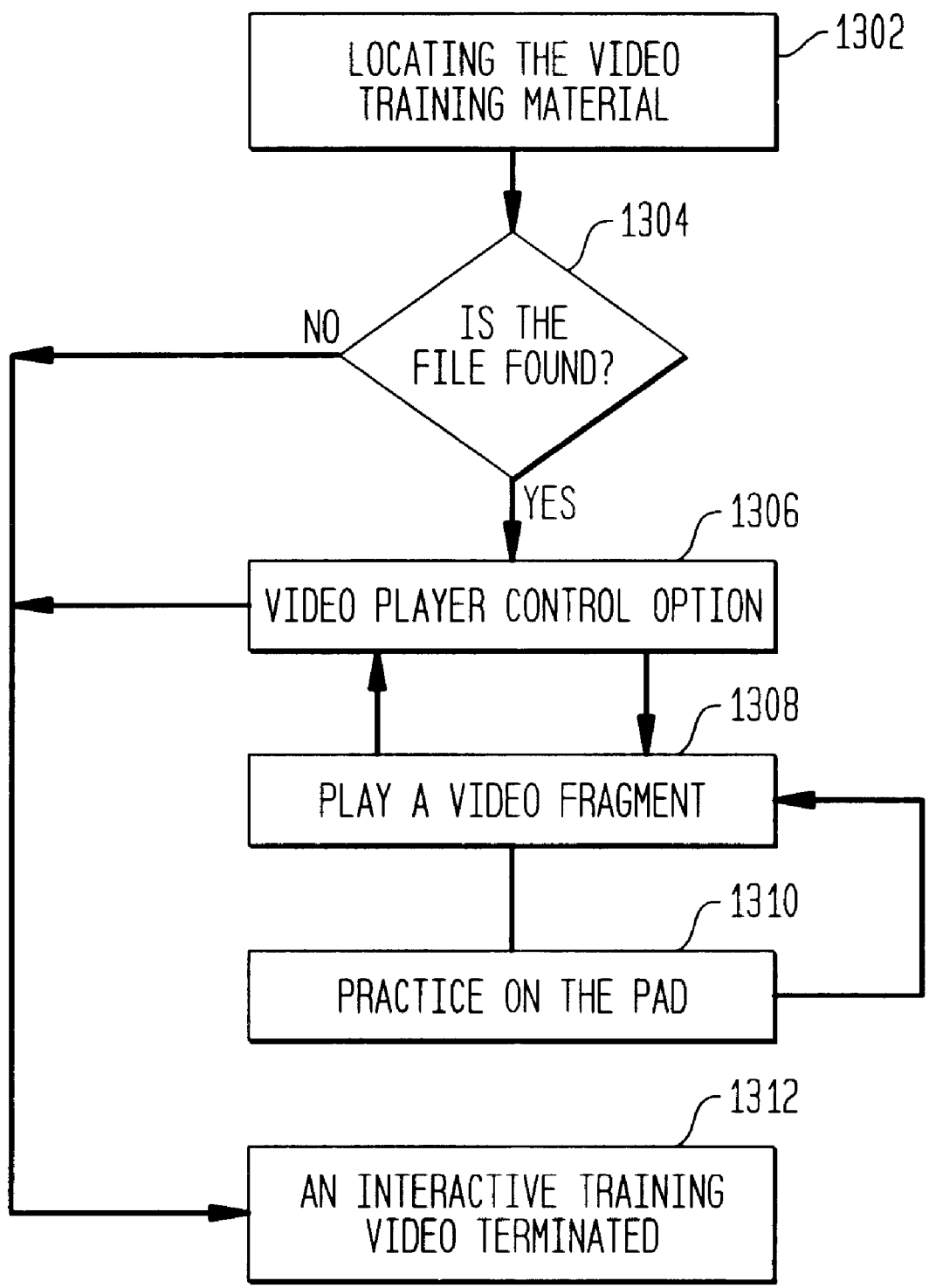
FIG. 13: A block diagram showing a video type play state diagram.

In FIG. 12, a user selects a specific video training material in step 1202. The user object 404 proceeds to step 1204 and determines whether the selected video is found. If the video is not found, the user object 404 proceeds to step 1222 wherein the video participation is terminated and processing returns to the main menu in step 1108.

In step 1204, if the user object 404 determines that the selected video is found, processing continues to step 1206.

In step 1206, the user object 404 displays the video menu options to the user wherein the user may select any of the following video topics or options pertaining to the theory and practice on manual breast examination: introduction (step 1208); clear model exam (step 1210); opaque model exam (step 1212 ); verification of results (step 1214); exam boundaries (step 1216); breast self exam (step 1218); and conclusion (step 1220). The user always has the option of returning to the video menu in step 1206. These video options are used for convenience purpose only. It would be readily apparent to one of ordinary skill in the art to make a different list of video topics available in an IBMS 100 of the present invention.

Each of the seven topics is linked to one pushbutton on the video menu on the computer screen. Buttons are numbered according to the sequence of the topics in the video material. After selecting any topic from the video menu, the user is forwarded to the video player form, as shown in FIG. 13, which is described in greater detail below.

There are two silicon breast models used in the preferred training video: a clear model exam (step 1210) and an opaque model exam (step 1212). The clear model examination topic teaches the user how to use her fingers, perform palpations and differentiate between the three levels of pressure (light, medium, and deep) during an examination. The model is divided into two halves wherein each half has a different level of texture-nodularity simulating various breast tissue.

This model teaches a user that breast tissue may feel, for example, like grain or sand under the skin. Artificial lumps may be implanted or embedded within the model at different locations to provide the user with the experience of finding a lump during an examination. The lumps may be hard or soft as well as located close to the surface, in the middle, or at the bottom of the model.

The video carefully describes the different types of palpation: light, medium, and deep. Between each segment, the video prompts the user to practice on the model so as to have the user interact with the video. The user gets a response from the practice examination through a graphic output on the computer display. In the preferred embodiment, the status of each sensor 218 is displayed in one of four colors. Table 1 below gives a description of applied pressure according to the display color:

TABLE 1

| Displayed Color | Black | Green | Yellow | Red |
|---|---|---|---|---|
| Applied Pressure | No Pressure | Light | Medium | Deep |

The opaque model exam (step 1212) topic on the video presents the preferred search pattern during the breast examination. A straight vertical strip search pattern is widely accepted as the most successful approach regarding the percentage of covered area and the number of identified lumps. In this video, the user is advised to start with her palpation at the far corner of the model at the top (representing the hollow of the armpit area). The user continues moving the pads of the fingers straight down the side until the leading finger goes off the edge of the model. Then, the user moves over one finger width with a short overlap slightly over the vertical strip. The user continues the exam upwards to the top of the model until the leading finger goes off the top edge of the model. The user then continues the same pattern over the entire surface of the model. The examination is complete when the opposite corner from the starting corner is reached.

During an examination, the video further instructs the user to use the three middle fingers for palpations. The user uses the pads of these fingers to make three small circles at each spot on the model using light, medium, and deep pressure. Whenever the user feels a lump, the user may place a sticker or other label or marker on the model. The labels are used after the examination for verification of the examination results.

The video directed to the verification of results (step 1214) pertains to the number of successfully identified lumps in the model and the search pattern performed on the model. Regarding the identification of lumps, conventional breast models show the location of embedded lumps on the bottom of the model. Therefore, by simply turning the model over, the user can compare the found lumps (by the labels placed during the examination) with the shown lumps on the model. If a label corresponds to the location of a lump, then the user properly identified that lump. This comparison allows the user to determine whether all lumps were found and the success of the examination. This video also presents some suggestions for further improvement of examination technique, e.g., pace, slight overlap between adjacent vertical strips, and the use of three small circles at each spot with increasing pressure.

The exam boundaries (step 1216) video informs the user about the boundaries of the breast area including the perimeter and positions of a breast on a person.

The breast self exam (step 1218) video demonstrates all of the components of a manual breast examination on a live patient.

The conclusion (step 1220) completes the video instruction and training and returns the user to the video menu option at step 1206, wherein the introduction (step 1208) provides a brief overview of all of the available video selections.

Once a user selects a specific video training video from the video menu in step 1206, the user object 404 proceeds to step 1302 as shown in FIG. 13 wherein processing immediately continues to step 1304. In step 1304, the user object 404 determines whether the selected video is found. If the video is not found, the user object 404 proceeds to step 1312 wherein the video training is terminated and processing returns to the main menu in step 1108.

In step 1304, if the training video is found, the user object 404 proceeds to step 1306 wherein the user controls the video fragment via conventional video controls: play, stop, pause, fast forward, and rewind. The user may also terminate the training session by selecting a quit option and proceeding to step 1312. Upon selecting a play option, e.g., play or fast forward, the user continues to step 1308 and the video fragment is played. While viewing the video fragment, the user also performs a practice examination on the IBMS 100. The user stays in this continual loop of watching the training video while practicing on the IBMS 100 until she stops the video via the video control options in step 1306.

Returning to FIG. 11, when the user selects to perform a breast examination and review the results (step 1114 ), the user is presented with the data collection component 308 of the user object 404. The preferred method of performing a breast examination with an IBMS 100 contains two consecutive parts: a personal risk estimator and an online data collection. In the preferred embodiment, a user first enters personal information for an analysis of her estimated risk for getting breast cancer, followed by her evaluation on performing a breast examination on the IBMS 100. This sequence is for convenience purpose only. It would be readily apparent for one of ordinary skill in the relevant art to have the risk estimation an optional selection.

Figure 14:
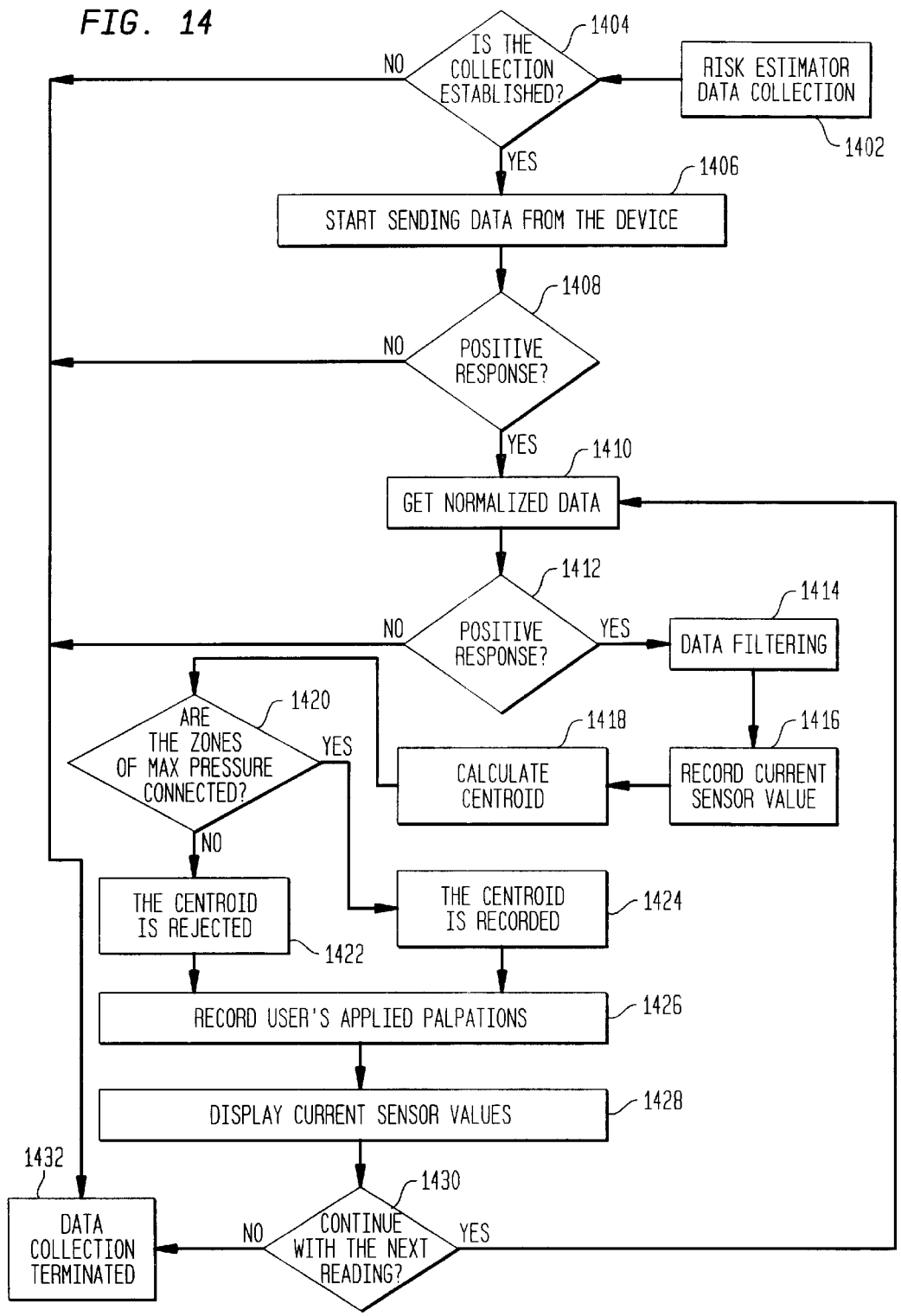
FIG. 14: A block diagram showing a breast examination state diagram.

The operation of a breast examination with an IBMS 100 is shown in FIG. 14. Processing begins at step 1402 wherein the user is presented with the risk estimator data collection. The risk estimator function of the data collector component 308 is described in greater detail below. Once the user enters her personal information, which the user object 404 stores in a personal information table 416, processing continues to step 1404 wherein the user object 404 communicates with the device object 402 to determine whether the sensor pad 106 is properly connected. If there is a proper connection, processing proceeds to step 1406. If there is not a proper connection, the user is so informed and the data collection is terminated in step 1432 and processing returns to the main menu in step 1108.

In step 1406, the data object 402 receives data from the sensor pad 106. Continuing to step 1408, the device object 402 determines whether there is a positive response from the sensor pad 106; that is, whether data from a sensor 218 in the sensor pad 106 has been received. If there is a positive response, the data object 402 continues to step 1410 to normalize the received data; that is, to translate the sensor data into a level of pressure. If there is not a positive response, the data object 402 proceeds to step 1432 wherein data collection is terminated and processing returns to the main menu in step 1108. The data collection component 308 is described in greater detail below.

In step 1410, after the normalized data is prepared and received, processing continues to step 1412 wherein the data object 402 determines if there continues to be a positive response from the sensor pad 106. If there is a positive response, the data object 402 continues to step 1414 to filter the normalized data which is described in greater detail below. If there is not a positive response, the data object 402 proceeds to step 1432 wherein data collection is terminated and processing returns to the main menu in step 1108.

In step 1414 after filtering the data, processing continues to step 1416 wherein the device object 402 records the current sensor value in the table of current sensor values 408. Processing continues to step 1418 wherein the maximum pressure, centroid 606, associated with the current sensor value is calculated. The calculation of a sensor's centroid 606 is described in greater detail below. After calculating the centroid 606, the data object 402 determines whether the zones of the maximum pressure are connected. If they are connected, processing continues to step 1424 wherein the centroid 606 value is recorded. If the zones are disconnected, processing continues to step 1422 wherein the centroid is rejected and not recorded. This process of calculating the centroid is described in greater detail below.

After processing the current level of pressure applied by a user, processing continues to step 1426 wherein the level of the user's palpation corresponding to the level of pressure applied (light, medium, deep) is recorded. Continuing to step 1428, this level of palpation is sent to the user object 404, recorded in the table of user's light palpations 410, table of user's medium palpations 412, or table of user's deep palpations 414, and displayed to the user in real time. Processing continues to step 1430 wherein the device object 402 determines whether to continue reading the next palpation. If there is a next palpation, processing returns to step 1410 as described above. If there is no next palpation to read and process, processing continues to step 1432 wherein data collection is terminated and the user is returned to the main menu in step 1108.

E. Data Collection

A user interacts with the IBMS 100 through the sensor pad 106 and the user interface 306. During an examination and practice, the user applies palpations on the breast model 102 wherein the palpations are recorded as pressure levels applied on the sensor pad 106 that is in communication with the breast model 102. This pressure data is collected, formatted as device data and sent to a computer system 112. The device data is further filtered and stored into the table of current sensor values 408. In addition, the device data may contain information about the sensor pad 106 configuration, including but not limited to, the number of sensors 218, the number of rows of sensors 218, the number of columns of sensors 218, and the sensor pad 106 descriptor information.

The data collection component 308 is divided into two parts: breast cancer risk estimator and online data acquisition from the IBMS 100. In each of these parts, the data collection component 308 receives input either directly from a user via a display interface 1708 or from a sensor pad 106.

Risk Estimator

The risk estimator is a method of making a user aware of the significance of breast cancer. Upon selection by a user from a main menu, the data collection component 308 asks the user to input personal information directed to the main factors that have been found to increase the risk of developing breast cancer: age, family history of breast cancer, personal history of breast cancer, childbearing, menstrual history, and body type. Each factor is formatted as a question followed by a list of optional answers, wherein each answer is given a score according to its significance as an indicator of the user being at risk for getting breast cancer. The user enters her personal information by choosing and clicking the appropriate option button through the series of multiple choice questions. which the user object 404 stores in the personal information table 416.

Table 1 shows the possible risk factors, optional answers, and the score given to each answer in the preferred embodiment of the present invention. The use of the risk factors in Table 2 are used for convenience purpose only. It would be readily apparent to one of ordinary skill in the relevant art to use comparable risk factors or estimators, such as those developed by the National Institutes of Health, Cancer Institute.

TABLE 2

| RISK FACTOR | CATEGORY | SCORE |
| --- | --- | --- |
| Age | Under 30 | 10 |
|  | 31–40 | 20 |
|  | 41–50 | 75 |
|  | 51–60 | 100 |
|  | Over 60 | 125 |
| Family History | None | 0 |
|  | 1 Aunt and Grandmother | 50 |
|  | Mother or Sister | 100 |
|  | Mother and Sister | 150 |
|  | Mother and 2 Sisters | 200 |
| Your History | No breast cancer | 0 |
|  | Previous breast cancer | 300 |
| Childbearing | First baby before age 30 | 0 |
|  | First baby after age 30 | 25 |
|  | No baby | 50 |
| Menstrual History | Began menstruating 15 or over | 15 |
|  | Began menstruating 12 to 14 | 25 |
|  | Began menstuating 11 or under | 50 |
| Body Type | Slender | 15 |
|  | Average | 25 |
|  | Overweight | 50 |

After the user has input her personal information, the risk estimator of the data collection component 308 evaluates the user's risk group by scoring the user's personal information. Based on this score, the user is ranked into one of four lifetime risk groups concerning the development of breast cancer. Table 3 shows the four risk groups and the preferred total score associated with each one:

TABLE 3

| IF YOUR SCORE IS | YOUR CATEGORY IS |
| --- | --- |
| Under 200 | Lowest Risk |
| 201–300 | Medium Risk |
| 301–400 | High Risk |
| Over 400 | Highest Risk |

Optionally, a user's personal information and resulting risk group is recorded and presented in the final presentation of results. After entering all of the personal information for the risk estimator, the user can start a real-time examination of the IBMS 100.

Online Data Collection

Online data collection is performed during the user's examination on the IBMS 100. While the user performs palpations 220 on the breast model 102, the pressure is detected by the sensor pad 106 and transformed into analog electric signals, which the sensor pad 106 converts into digital data and transmits to the computer system 112. In using a tactile sensor pad 106, reading the data from the sensor pad 106 can be done using one of two API functions: reading normalized data or reading raw data.

In the preferred embodiment, the data collection component 308 reads normalized data provided directly from the sensor pad 106. The normalization function relies on Tactex factory settings during the calibration of the sensor pad 106. This normalized data gives a linear function between applied load-pressure and converged signal. During use of the sensor pad 106, visco-elastic properties of the foam layer 204 can change. Therefore, calibration of the sensor pad 106 must be performed at regular time intervals.

Reading normalized data from the sensors 218 of the sensor pad 106 gives the converged values in a range 0–1023. In the preferred embodiment of the IBMS 100, this value range is divided into sub-ranges to represent the different levels of palpations 220, or pressure, applied to the breast model 102. Table 4 shows the preferred sub-ranges of the normalized data from the sensors 218:

TABLE 4

| Applied Pressure | No Pressure | Light Pressure | Medium Pressure | Deep Pressure |
| --- | --- | --- | --- | --- |
| Normalized Data | <70 | 71–300 | 301–700 | 701–1023 |

These sub-ranges are used for convenience purpose only. It would be readily apparent to one of ordinary skill in the relevant art to use a different scale of sub-ranges for normalizing the data from the sensors 218.

The data collection component 308 of the IBMS software 300 must also take into account the fact that the breast model 102 is a three dimensional model such that the same applied pressure on different locations on the breast model 102 does not register equal readings on the sensor pad 106. Because the central portion of the breast is thicker, greater displacement (or more pressure) must occur for an accurate reading. Therefore, a scaling factor is required for each sensor 218 in the sensor pad 106. FIG. 5 shows the preferred weights 500 assigned for the 72 sensors 218 embedded within the sensor pad 106. These preferred weights 500 are used according to the visco-elastic properties of the specific silicone breast model 102 in the preferred IBMS 100. Alternative breast models 102 may have different shapes and thicknesses. Therefore, a table of weights 500 is needed that corresponds to the specifications of the breast model 102. It would be readily apparent for one of ordinary skill in the relevant art to determine the weights 500 for the sensors 218 used in an alternative IBMS 100.

Data collection occurs every 50 ms (20 Hz reading rate). In the preferred embodiment, there is a table of four last readings for every sensor 218. Using a last-in-first-out buffer, when a new reading appears, the oldest reading is removed from the list. A mean value of the four table entries is calculated and then classified into one of the four possible levels and stored in the table of current sensor values 408. This function is performed by the data filtering component 406.

During an examination, a user must cover the entire area of the breast model 102 and have three distinguished levels of pressure at each location. Accordingly, there are three tables—one for each level of pressure (table of user's light palpations 410, table of user's medium palpations 412, table of user's deep palpations 414) for each sensor 218. Each place in a table is latched when the user applies and holds pressure on the same spot for a minimum of at least 0.2 seconds. This period is long enough for the user to sense the nodularity of the breast tissue in the model 102 and to identify any breast lumps 216*a–c*. The latching tables are then used in the evaluation of the user's results.

Another important issue during a breast examination is the detection of the user's search pattern. During a palpation, it is preferable for a user to use the pads of three 30 fingers. Applied pressure on a breast model 102 is registered and displayed on a computer display as a wide connected zone, or zone of influence 602. See FIGS. 6A, B. The centroid 606 of the zone of influence 602 is used to determine the user's search pattern during the examination.

When the palpation is applied on the breast model 102, the zone of influence 602 is generated. This zone 602 is presented visually as a convex area with increasing pressure from an outer zone 610 having a slight level of pressure, to a middle zone 608 having a medium level of pressure, to the centroid 606 of the zone 602 having the maximum level of pressure. The centroid 606 registers the highest level of pressure as well as the current spot along the search pattern during the examination. Calculating the centroid 606 is the key for locating the exact position of the user's current spot of examination. Connecting all of the registered spots during the examination forms the search pattern. The centroid 606 can be calculated using the equations:

$$X_{centroid} = \left(\sum_n X_i * W_i\right)/n$$

$$Y_{centroid} = \left(\sum_n Y_i * W_i\right)/n$$

wherein $X_i$ is the horizontal position of the i-th sensor 218 in the sensor pad 106, $Y_i$ is the vertical position of the i-th sensor 218 in the sensor pad 106, and $W_i$ is the value or weight 500 of the applied pressure for the i-th sensor 218. Once the centroid 606 is calculated, the level of applied pressure is needed.

Figure 6A:
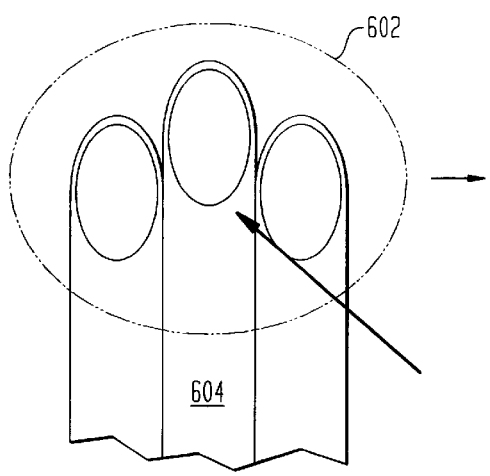
FIG. 6A: A planar top view of correct finger placement for a breast examination.
Figure 6B:
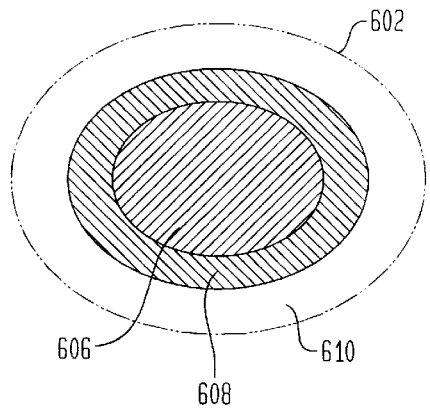
FIG. 6B: A block diagram of the levels of displacement corresponding to the correct finger placement.

The first step of calculating the level of applied pressure at a specific spot on the sensor pad 106 is to find the maximum level of latched pressure within the entire sensor pad 106. After the maximum pressure is determined, collection of all positions having that same level of maximum pressure is performed. These positions are stored in the recorded palpations table 418. If the user keeps all fingers 604 together, as shown in FIG. 6, the positions with the maximum registered pressure are connected forming one zone 602. This indicates that the user focused on one position during a palpation. In this case of a correct palpation, as shown in FIGS. 6A–B, a located centroid 606 is treated and recorded in the table of the user's search pattern.

Figure 6C:
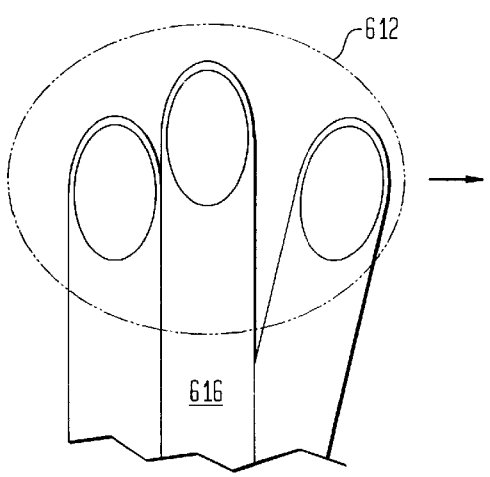
FIG. 6C: A planar top view of incorrect finger placement for a breast examination.
Figure 6D:
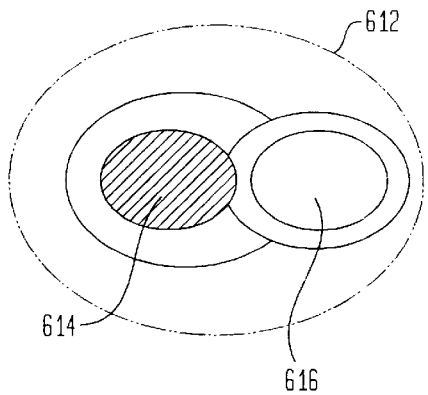
FIG. 6D: A block diagram of the levels of displacement corresponding to incorrect finger placement.

In the case of an incorrect palpation, as shown in FIGS. 6C–D, where a user does not keep her fingers 610 together during a palpation, the zone 612 of the maximum pressure is disconnected. See FIG. 6B. That is, the disjointed placement of fingers 610 results in two or more possible centroid zones 614, 616. The calculated centroid belongs to one of the possible centroid zones 614, 616 or might even be outside of the entire zone of influence 612. This case is treated as an irregular situation and the centroid 614, 616 is therefore not recorded.

Figure 7:
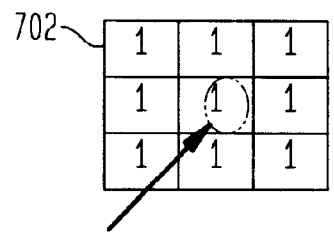
FIG. 7: A block diagram of a kernel used in the search of connected points.

The search for the zones 602 of the current maximum applied pressure, or centroid 606, and their connectivity is processed using a 3×3 kernel 702. See FIG. 7. All points of current maximum applied pressure are recorded. The IBMS software 300 uses a search algorithm, as shown in FIG. 8, for determining the connectivity of the zones of influence 602 and the user's search pattern. In this search algorithm, processing starts with the first recorded maximum pressure and tries to find any other recorded point that is connected within a distance defined by the kernel, wherein, in the preferred embodiment, the distance is 1 as shown in FIG. 7.

In FIG. 8, processing starts at step 802 and immediately proceeds to step 804. In step 804, the user object 404 stores the first recorded point from the table of recorded palpations 418 into a temporary buffer. The temporary buffer presents a set of currently found adjacent points. Proceeding to step 806, the user object 404 enters a loop for reading the recorded points in the temporary buffer wherein it reads the next recorded point and continues to step 808. In step 808, the user object 404 determines whether there is any other adjacent recorded point within the kernel in relation to the current point being analyzed. If the user object 404 determines there is an adjacent recorded point, processing proceeds to step 810. In step 810, the user object 404 moves the point from the recorded palpations table 418 into the temporary buffer and continues to step 812 which is described in detail below. Returning to step 808, if the user object 404 determines there is not an adjacent recorded point, processing proceeds to step 812.

In step 812, the user object 404 removes the considered point from the temporary buffer and continues to step 814. In step 814, the user object 404 determines whether there are any other points in the temporary buffer, i.e., is the temporary buffer empty? If the user object 404 determines that the temporary buffer is not empty, processing returns to step 806 which is described above. If the user object 404 determines that the temporary buffer is empty, processing proceeds to step 816.

In step 816, the user object 404 determines whether there are any other points in the table of recorded points. If the user object 404 determines that the table of recorded points is empty, processing proceeds to step 818 wherein the zones 602 are connected and the calculated centroid 606 is recorded. If the user object 404 determines in step 816 that the table of recorded points is not empty, processing proceeds to step 820 wherein the zones 602 are disconnected and the calculated centroid 606 is discarded and not recorded.

A table of recorded palpations 418 is used for a visual presentation of the user's result during an examination. These results are also available in a MicroSoft Excel worksheet table.

Evaluation of Results

The Exam Evaluator 312 and the Interpretor and Presentor of Results 310 modules of the user object 404 of the IBMS software 300 assess two important factors about a user's performance during the examination of a breast model 102: the effectiveness of the three different levels of pressure applied over the entire area of the breast model 102, and the similarity between the ideal search pattern and the user's search pattern.

The user object 404 calculates the successful coverage of the breast model 102 using the three tables of latched pressures. Each table contains the picture of one level of pressure that was latched for each of the sensors 218 of the sensor pad 106. The total number of locations covered for each applied pressure is compared with an ideal Experts Performance table and a relative ratio is derived showing the user how close she was to the Experts Performance table.

The user object 404 also presents the user's search pattern of the breast model 102 through animation and through a plot graph. A user's search pattern is formed when all detected centroids 606 are connected in the sequence of their appearance during the examination. Compared to an ideal search pattern, a user can locate the areas on the breast model 102 in which she needs to correct or improve her performance.

The rate of success in the applied search pattern is based on the comparison of lengths between the ideal search pattern and the user's search patter. As discussed above and as shown in FIG. 10, in the preferred embodiment, the sensor pad 106 has 72 sensors 218 embedded within it that are arranged in a matrix configuration 1000 of six rows 1002a–f and twelve columns 1004a–1014b. Because the vertical strip search pattern is the most effective method of searching, the twelve columns 1004a–1114b are grouped into six main rows or strips ( 1004, 1006, 1008, 1010, 1012, 1014 ) each being two sensor columns wide, e.g., 1004a–b. Each strip is assigned with a movement direction, wherein UP indicates searching from the top to the bottom edge of the breast model 102, and DOWN indicates searching from the bottom to the top edge of the breast model 102.

Figure 9:
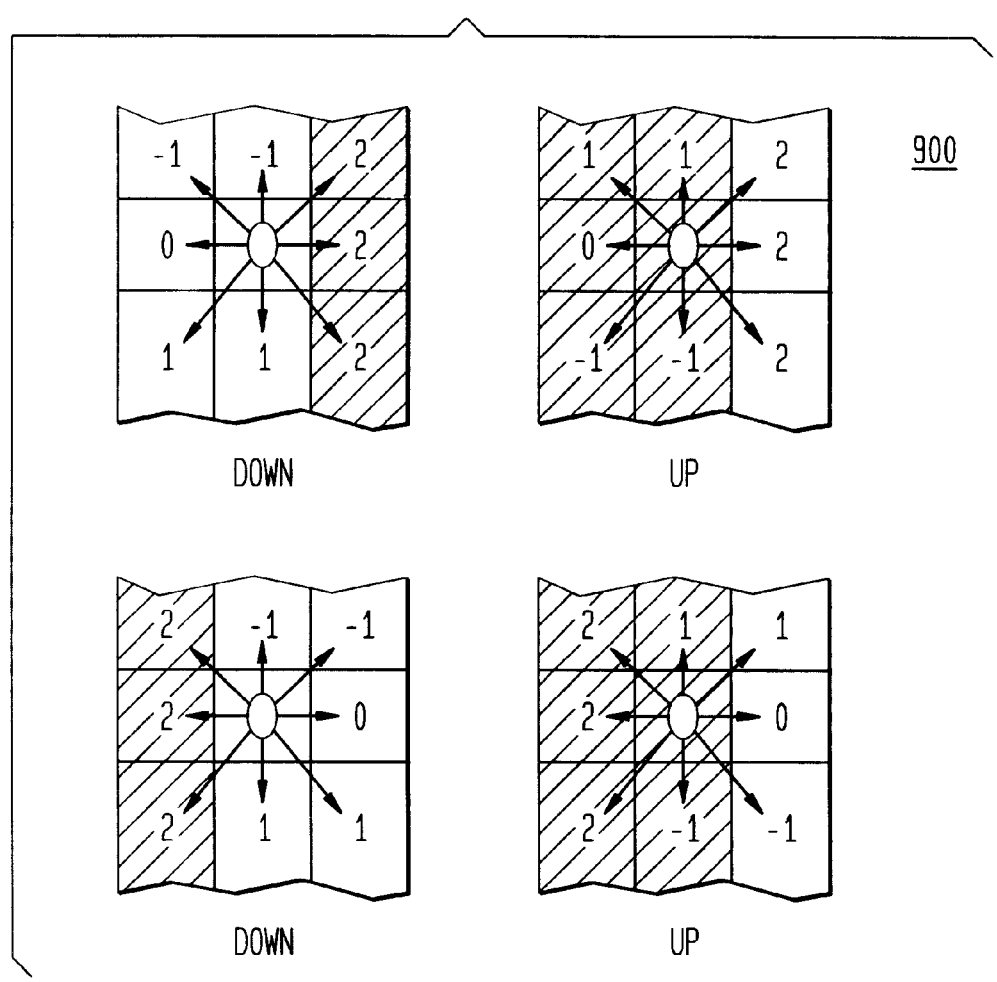
FIG. 9: A block diagram showing the distance matrices in calculating a user's movement during an examination.

Recorded centroids 606, as stored in the recorded palpations table 418, are used as points of applied pressure on the breast model 102. Accordingly, the user object 404 starts from the first recorded centroid 606 and measures the distance from the next adjacent centroid 606. According to an assigned direction, each sensor 218 within a row 1004, 1006, 1008, 1010, 1012, 1014 has a different operator used for a distance measurement. In the preferred embodiment, the distance operator is defined as a set of 3×3 distance matrices 900 as shown in FIG. 9.

As shown in the distance matrices 900, each time a user moves her fingers into the next strip 1004, 1006, 1008, 1010, 1012, 1014, the distance from the previous centroid 600 increases. Moving within a strip 1004, 1006, 1008, 1010, 1012, 1014 gives the optimized total length of the search pattern. When the total length of the search pattern is calculated, it is compared with the length of the ideal search pattern. If the user's search pattern is close or similar to the ideal search pattern, the difference between the two total lengths is small. The ratio of success in the user's search pattern is based on the calculated search pattern difference and is recorded in the user's results from the examination.

In the preferred embodiment, the user object 404 presents the results of the user's performance as a series of tabbed pages. The use of tabbed pages in user displays is well known in the relevant art and are widely used. In this embodiment, the first page shows the user's personal information that was collected as part of the risk estimator. See Table 2. The second page of results presents a table of the user's applied pressures over the entire breast area in comparison with an expert's performance table. The table is a matrix corresponding the matrix of sensors 218, wherein each cell of the matrix contains a color code for each level of pressure recorded by that corresponding sensor 218. The third page shows the user's search pattern through animation of the pattern performed over time or by a linear graph plot having one or more lines with or without arrows showing the pattern.

F. Calibration

A user, or other operator or technical support person, can use device commands to calibrate the sensor pad's 106 performance. Upon activation, the calibration algorithm 302 of the IBMS software 300 sets the properties needed for correct performance of the entire system.

The calibration is related to the sensor pad 106 and the breast model's 102 silicone properties which change with time. The breast model 102 settings include three pressure thresholds and sensor weights 500. According to the elastic properties and the three dimensional oval form of the model 102, a different table of sensor weights 500 needs to be defined for each new silicone breast model 102. When a specific sensor 218 is selected, the user needs to apply the maximum allowed light pressure on the selected sensor 218. When the user is done, a value is recorded. The user repeats this procedure to calibrate both the medium and deep pressure thresholds. See Table 4. Using these three values, a linear function is calculated along with the sensor weight 500.

A IBMS 100 may be calibrated for each type of model 102 used. However, the IBMS 100 also may contain a table, or set of tables, in a database for various models 102 such that upon use of a specific model 102 using a predefined types of silicone, a user simply has to selected the corresponding table of maximum pressure values, e.g., Table 4, and table of sensor weights 500.

G. Exemplary Computer System

Figure 17:
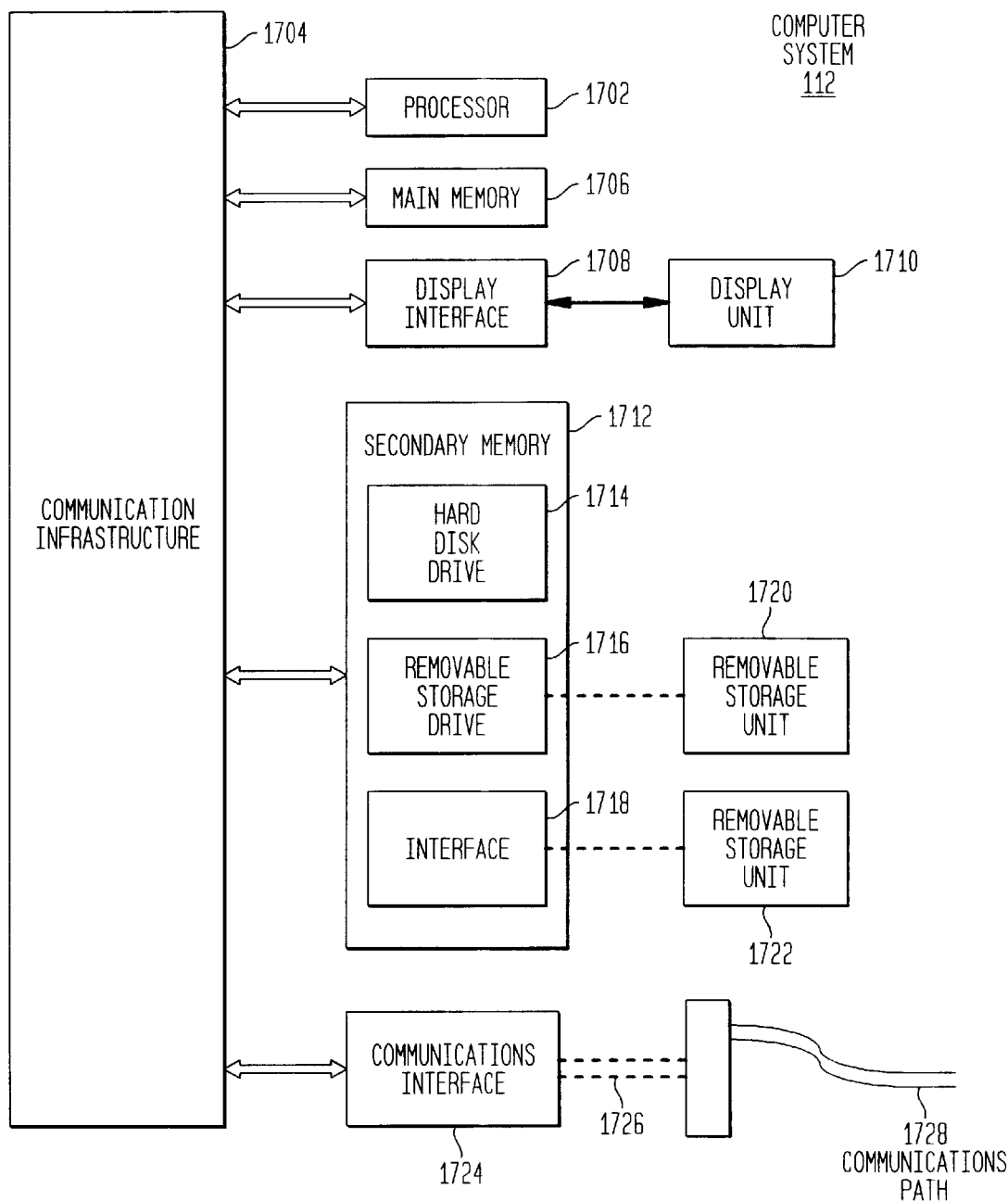
FIG. 17: An exemplary computer system.

FIG. 17 is a block diagram showing an exemplary computer system 112 which can be used with the IBMS software 300 of an IBMS 100 of the present invention The computer system 112 includes one or more processors, such as a processor 1702. The processor 1702 is connected to a communication infrastructure 1704, e.g., a communications bus, cross-over bar, or network. Various software embodiments are described in terms of this exemplary computer system 112. After reading this description, it will become apparent to a person of ordinary skill in the relevant art(s) how to implement the present invention using other computer systems and/or computer architectures.

The computer system 112 includes a display interface 1708 that forwards graphics, text, and other data from the communications infrastructure 1702 (or from a frame buffer not shown) for display on the display unit 1710, e.g., a computer screen or monitor on which a graphical user interface, including a window environment, may be displayed. The display interface 1708 can also include one or more input peripherals, including, for example, a keyboard, a mouse, a light pen, a pressure-sensitive screen, etc., which provide a user with the capability of entering such input to the computer system 112.

The computer system 112 also includes a main memory 1706, preferably random access memory (RAM), and may also include a secondary memory 1712. The secondary memory 1712 may include, for example, a hard disk drive 1714 and/or a removable storage drive 1716, representing a floppy disk drive, a magnetic tape drive, an optical disk, a compact disk drive, etc. which is read by and written to by a removable storage unit 1720. The removable storage unit 1720, also called a program storage device or a computer program product, represents a floppy disk, magnetic tape, optical disk, compact disk, etc. As will be appreciated, the removable storage unit 1720 includes a computer usable storage medium having stored therein computer software and/or data. The removable storage drive 1716 reads from and/or writes to a removable storage unit 1720 in a well known manner.

In alternative embodiments, secondary memory 1712 may also include other similar means for allowing computer programs or other instructions to be loaded into the computer system 112. Such means may include, for example, an interface 1718 and a removable storage unit 1722. Examples of an interface 1718 may include a program cartridge and cartridge interface (such as that found in video game devices), a removable memory chip (such as EPROM, or PROM) and associated socket, and other removable storage units 1722 and interfaces 1718 which allow software and data to be transferred from the removable storage unit 1722 to the computer system 112.

The computer system 112 may also include a communications interface 1724. Communications interface 1724 allows software and data to be transferred between the computer system 112 and external devices. Examples of communications interface 1724 may include a modem, a network interface (such as an Ethernet card), a communications port, a PCMCIA slot and card, etc. Software and data transferred via communications interface 1724 are in the form of signals 1726 which may be electronic, electromagnetic, optical, wireless or other signals capable of being received by communications interface 1724. These signals 1726 are provided to communications interface 1724 via a communications path (i.e., channel) 1728. This channel 1728 carries signals 1726 and may be implemented using wire or cable, fiber optics, a phone line, a cellular phone link, an RF link and other communications channels 1728.

In this document, the term "computer program medium" and "computer usable medium" are used to generally refer to media such as removable storage unit 1720, 1722, a hard disk installed in hard disk drive 1714, and signals 1726. These "computer program products" are means for providing software to a computer system 112. Portions of the present invention are directed to such computer program products. It would be readily apparent for one of ordinary skill in the relevant art to design and implement the described software for an IBMS 100 of the present invention.

Computer programs (also called computer control logic) are stored in main memory 1706 and/or secondary memory 1712. Computer programs may also be received via communications interface 1724. Such computer programs, when executed, enable the computer system 112 to perform the features of the present invention as discussed herein. In particular, the computer programs, when executed, enable the processor 1704 to perform the features of the present invention. Accordingly, such computer programs represent controllers of the computer system 112.

In an embodiment where portions of the invention are implemented using software, the software may be stored in a computer program product and loaded into computer system 112 using removable storage drive 1716, a hard disk drive 1714, interface 1718, or communications interface 1724. The software, when executed by the processor 1704, causes the processor 1704 to perform the functions of the invention as described herein.

In another embodiment, the invention is implemented primarily in hardware using, for example, a hardware state machine, such as application specific integrated circuits (ASICS). Implementation of the hardware state machine so as to perform the functions described herein will be apparent to persons skilled in the relevant arts.

In yet another embodiment, the invention is implemented using a combination of hardware and software.

The preferred computer system 112 is a personal computer having a single processor and executing a windows operating system. The personal computer is used for convenience purpose only, the present invention also can be developed on any appropriate computer system, e.g., a sun workstation or mainframe computer. The present invention is described in terms of a computer system 112 having a single processor 1704 for convenience purposes only. It would be readily apparent, however, to one skilled in the relevant arts to use a computer system 112 having multiple processors 1704, thereby executing the present invention in parallel.

The preferred embodiment of the IBMS software 300 of the present invention is implemented in software, and more specifically, is written in the programming language C++, Borland C++ Builder 5 for the graphical user interface. In addition, Rational Rose C++ was used for the object oriented analysis and design. The preferred embodiment is described in these terms for convenience purpose only. Other comparable computer systems 112, programming languages and object oriented analysis and design applications could alternatively be used.

H. Additional Applications

The instrumented model system of the present invention and its use of a solid-state sensing system may be expanded to include many additional applications for tactile sensing of fingers or other physical assessment maneuvers in health care applications. These may include such applications as shown in Table 5:

TABLE 5

| ANATOMY | Application |
| --- | --- |
| Head and Neck | Throat cultures |
|  | Palpation of lymph nodes in the head and neck |
|  | Palpation of thyroid gland |
|  | Palpation for spinal abnormalities |
|  | Auscultation of carotid arteries for bruits and abnormalities |
|  | Evaluation of sinuses |
| Cardiac | Cardiac rate and rhythm |
|  | Five areas of cardiac auscultation: Aortic, Pulmonic, Ticuspid, Erbs, Mitral |
|  | Estimation of Cardiac Size |
|  | Palpation of Point of Maximum impulse |
|  | Palpation for Thrills or murmurs |
| Lungs | Rate, Rhythm, Symmetrical Expansion |
|  | Palpation of Lung Borders |
|  | Areas for Auscultation of the Lungs |
|  | Palpation of chest wall |
|  | Percussion for abnormalities |
|  | Techniques for suctioning of lungs |
| Abdomen | Areas of auscultation (4 quadrants) |
|  | Areas for light and deep palpation |
|  | Evaluation of liver consistency and size (palpation and percussion) |

TABLE 5-continued

| ANATOMY | Application |
|---|---|
| | Evaluation of spleen size (palpation and percussion) |
| | Evaluation of kidney size and position |
| | Palpation of abdomen for abnormalities |
| | Digital Rectal Examination |
| | Techniques for inserting nasogastric tubes |
| | Techniques for inserting rectal tubes |
| | Techniques for appendix |
| Genitourinary | Female: Palpation for uterine size (pregnant and non-pregnant) |
| | Palpation of ovaries and tubes (normal and abnormal) |
| | Evaluation of cervical dilitation during labor |
| | Evaluation of Pap smear technique |
| | Fetal growth (ie. fundal height, fetal lie and position such as breech presentation, transverse, or head down positions) |
| | Urinary catheters insertion (female) |
| | Male: Prostate examination |
| | Testicular examination |
| | Examination for inguinal hernias as well as other hernias |
| | Insertion of urinary catheters (male) |
| Extremities | Differential pressures (such as brachial/popliteal) |
| | Palpation of pedal pulses |
| | Evaluation of arterial perfusion |
| | Evaluation of venous return |
| | Evaluation of Edema |
| Musculoskeletal and Neurologic | Evaluation of bony abnormalities and fractures |
| General | Palpation of lymph nodes throughout the body |
| | Assessment of skin lesions (accurate sizing, measurement) |
| | Inclusion of the three assessment parameters for entire physical examination including: auscultation, percussion, and palpation |

Figure 15:
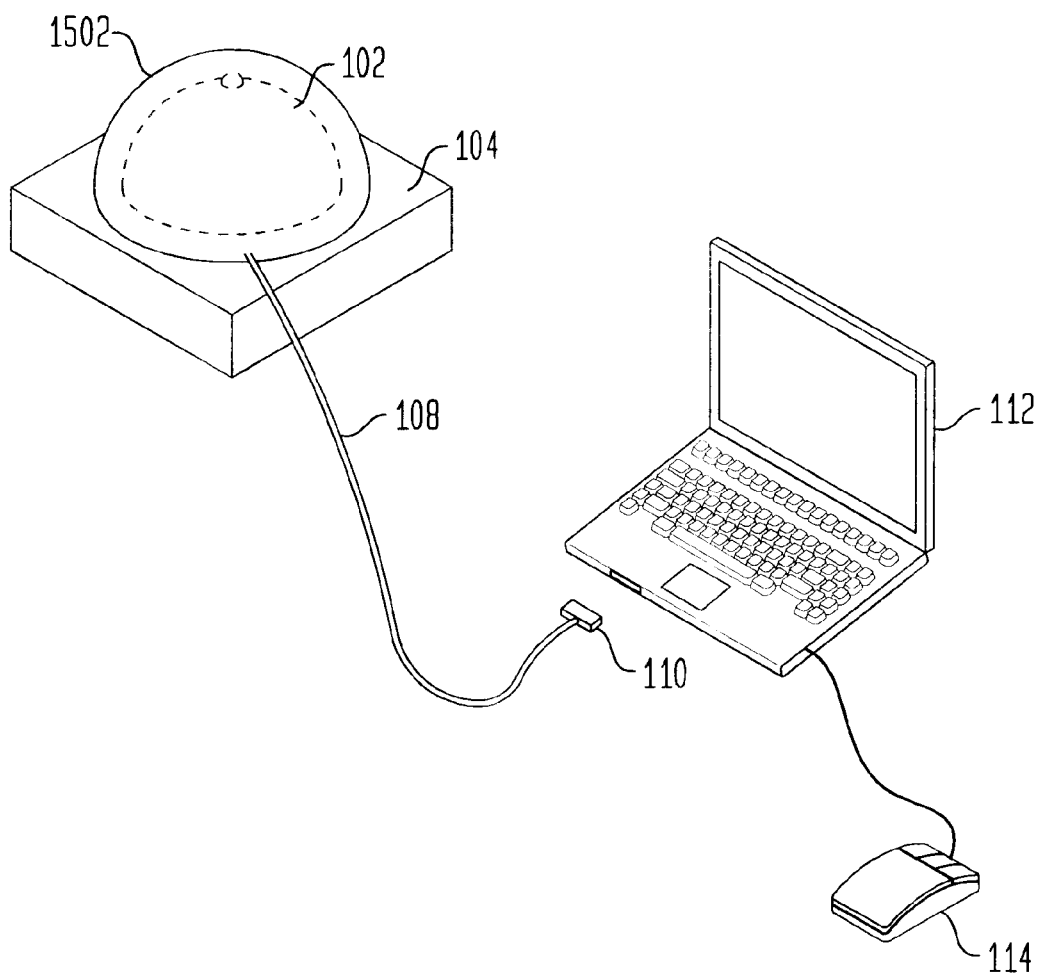
FIG. 15: A perspective diagram of an alternative instrumented breast model system.

To accomplish these many different types of applications, it may be necessary to use a different type of solid-state sensing system or a different arrangement, or configuration, of a model of human anatomy with a solid-state sensing system. For example, as shown in FIG. 15, a sensor pad 1502 may be place over a model of human anatomy, e.g., a breast model 102, or part of a patient's anatomy. Alternatively, the sensor pad 1502 may be placed under the skin of the model of human anatomy. It is also possible to use a combination of configurations on a single model of human anatomy. For example, a first portion of a model may incorporate a first sensor pad under the model, while a second portion of the model may incorporate a second sensor pad under the skin of the second portion.

In another alternative, a solid-state sensing system is used as filler material such that a model is filled with a solid-state sensing material. For example, a manikin of an entire human body may be filled with such a sensing material thereby allowing a complete examination, including but not limited to, examination in the mouth, uterus, cervix, and rectum.

The present invention also works with a solid-state sensing material, e.g., pressure sensitive piezo-electric polymer materials, that does not inherently provide finger placement data (as the Tactex sensor pad 106 does), but rather, only provides pressure data. In this embodiment, the finger placement data is determined by cutting the sensing material into strips and positioning the strips into a matrix configuration. Therefore, when a model or part is placed on top of the matrix of strips or the strips are placed on top of the model or part, the finger placement of a user is determined by using fuzzy logic to determine which strips have recorded levels of pressure. The remainder of this embodiment, such as the analysis and reporting of the data is the same as described above.

Figure 16:
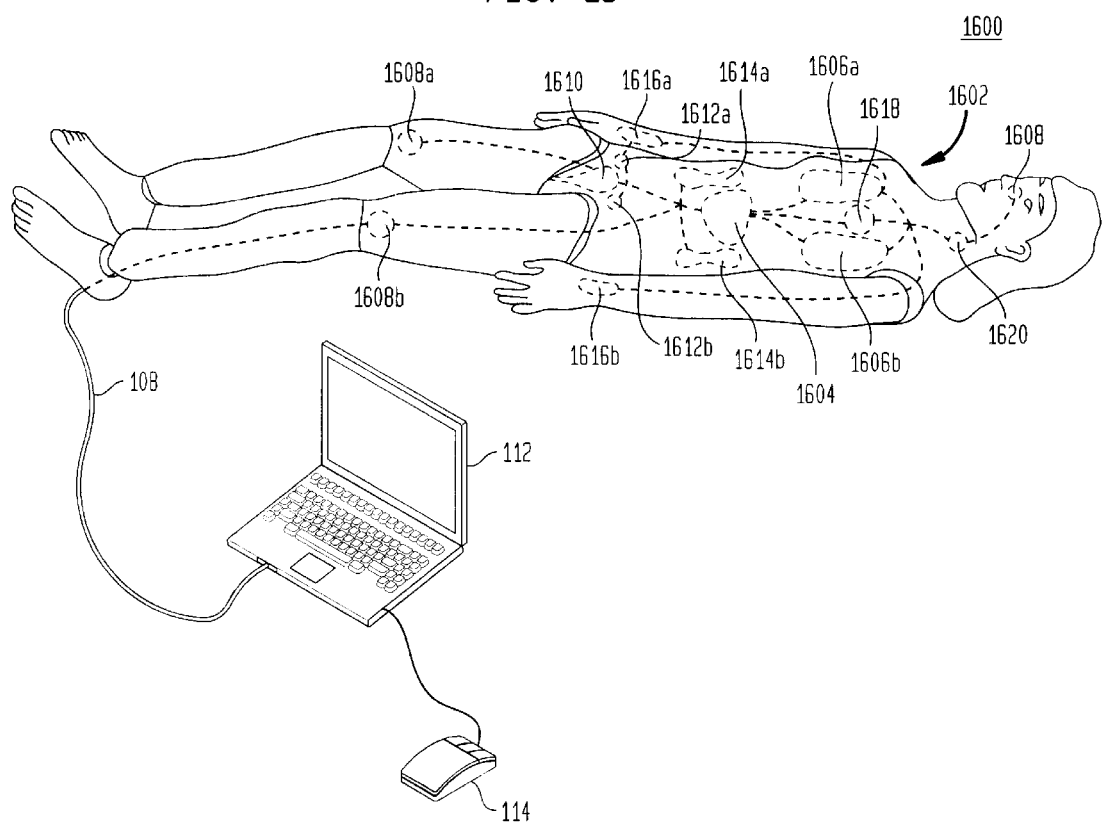
FIG. 16: A perspective diagram of an alternative instrumented model system embedding target objects in a manikin.

FIG. 16 is a perspective diagram of another embodiment of the present invention. In this application, a solid-state sensing material is wrapped around one or more organs, e.g., heart 1618, lungs, 1606a,b, uterus 1610, ovaries 1612a,b, liver 1604, kidneys 1614a,b, etc. and the organ(s) are embedded within a manikin 1602. In addition, solid state sensing material may be used to represent the muscular and skeletal structure, e.g., knees 1608a,b, spin, etc., as well as glands, e.g., lymph nodes 1620 and sinuses 1608. All of the organs or other portions of human anatomy that are modeled within the manikin 1602 are connected by conventional means to a computer system 112 as described in detail above. Then, the system records and reports the results of a trainee performing a physical examination of the manikin 1602 such as whether the trainee made a thorough examination of the target organs, muscular/skeletal structure, and glands.

The present invention is described in terms of human anatomy for convenience purpose only. It would be readily apparent to one of ordinary skill in the relevant art to use the instrumented model system of the present invention with models of human anatomy as well as with models of animals for veterinary examinations and procedures.

Conclusion

While various embodiments of the present invention have been described, it should be understood that they have been presented by the way of example only, and not limitation. It will be understood by those skilled in the art that various changes in form and details may be made therein without departing from the spirit and scope of the invention. Thus, the breadth and scope of the present invention should not be limited by any of the above-described exemplary embodiments, but should be defined in accordance with the described terms and their equivalents.

What is claimed is:

1. An instrumented model system for training a person on performing a physical examination, comprising:
   a model of anatomy;
   a means for detecting two or more levels of pressure applied to said model during a physical examination of said model;
   a means for detecting a position of each said level of pressure on said model during the examination of said model; and
   a means for reporting to the person said levels of pressure and said position of each said level of pressure applied by the person and recorded during the person's physical examination of said model;
   wherein said means for detecting two or more levels of pressure and said means for detecting a position of each said level of pressure are external to said model.

2. The instrumented model system according to claim 1, wherein said means for detecting two or more levels of pressure and said means for detecting a position of each said level of pressure is a tactile sensor pad in contact with an external surface of said model.

3. The instrumented model system according to claim 2, wherein said tactile sensor pad is positioned under said model.

4. The instrumented model system according to claim 1, wherein said means for detecting a position of each said level of pressure and said means for detecting two or more levels of pressure applied to said model during the physical examination of said model is performed by a single solid-state sensing system.

5. The instrumented model system according to claim 1, wherein said model is selected from a group consisting of a model of human anatomy and a model of animal anatomy.

6. The instrumented model system according to claim 5, wherein said model is a breast model.

7. The instrumented model system according to claim 1, wherein said model is embedded within a second model of anatomy.

8. The instrumented model system according to claim 7, wherein said model is selected from a group consisting of an organ, a bone, a bone structure, a gland, a muscle, and a tumor, and said second model is a mannikin.

9. The instrumented model system according to claim 1, wherein said means for detecting two or more levels of pressure and said means for detecting a position of each said level of pressure is a solid-state sensing system selected from the group consisting of fiber-optic based, pressure sensitive, smart fabric, pressure sensitive piezo-electric polymer materials, and capaciflectors.

10. The instrumented model system according to claim 9, wherein said model of anatomy is manufactured from said solid-state sensing system.

11. The instrumented model system according to claim 1, further comprising a means for training the person on the proper use of the modeling system.

12. The instrumented model system according to claim 1, further comprising a means for informing the person about a predefined disease.

13. The instrumented model system according to claim 1, further comprising a means for estimating the person's risk of getting a predefined disease.

14. The instrumented model system according to claim 1, further comprising a computer system in communication with said means for detecting two or more levels of pressure, said means for detecting a position of each said level of pressure, and said means for reporting said levels of pressure and said position of each said level of pressure.

15. The instrumented model system according to claim 1, wherein means for detecting said two or more levels of pressure generates pressure data when the person palpates the exterior surface of said model.

16. The instrumented model system according to claim 1, wherein one or more lumps are embedded within said model.

17. The instrumented model system according to claim 1, wherein said means for reporting occurs in real time with the person performing the physical examination of said model.

18. An instrumented model system for training a person on performing a physical examination, comprising:
a model of anatomy;
a means for detecting two or more levels of pressure applied to said model during a physical examination of said model;
a means for detecting a position of each said level of pressure on said model during the examination of said model; and
a means for reporting to the person said levels of pressure and said position of each said level of pressure applied by the person and recorded during the person's physical examination of said model;
wherein said means for detecting two or more levels of pressure and said means for detecting a position of each said level of pressure are external to said model;
wherein said means for detecting two or more levels of pressure and said means for detecting a position of each said level of pressure is a tactile sensor pad in contact with an external surface of said model; and
wherein said tactile sensor pad is over-laid on top of said model.

19. An instrumented model system for training a person on performing a physical examination, comprising:
a model of anatomy;
a means for detecting two or more levels of pressure applied to said model during a physical examination of said model;
a means for detecting a position of each said level of pressure on said model during the examination of said model; and
a means for reporting to the person said levels of pressure and said position of each said level of pressure applied by the person and recorded during the person's physical examination of said model;
wherein said means for detecting two or more levels of pressure and said means for detecting a position of each said level of pressure are external to said model;
wherein said means for detecting two or more levels of pressure and said means for detecting a position of each said level of pressure is a tactile sensor pad in contact with an external surface of said model; and
wherein said tactile sensor pad is wrapped around said model.

20. An instrumented model system for training a person on performing a physical examination, comprising:
a model of anatomy;
a means for detecting two or more levels of pressure applied to said model during a physical examination of said model;
a means for detecting a position of each said level of pressure on said model during the examination of said model; and
a means for reporting to the person said levels of pressure and said position of each said level of pressure applied by the person and recorded during the person's physical examination of said model;
wherein said means for detecting two or more levels of pressure and said means for detecting a position of each said level of pressure are external to said model;
wherein said means for detecting two or more levels of pressure and said means for detecting a position of each said level of pressure is a tactile sensor pad in contact with an external surface of said model; and
wherein said tactile sensor pad comprises:
a protective membrane;
a substrate;
a foam layer positioned between said protective layer and said mechanical substrate; and
a plurality of sensor embedded within said foam layer.

21. The instrumented model system according to claim 20, wherein said plurality of sensors are arranged in a matrix configuration within said foam layer.

22. The instrumented model system according to claim 20, wherein each sensor of said plurality of sensors comprises a first fiber optic cable and a second fiber optic cable.

23. The instrumented model system according to claim 22, further comprising an optical LED communicably connected to said first fiber optic cable, and a photodiode communicably connected to said second fiber optic cable.

24. An instrumented model system for training a person on performing a physical examination, comprising:
a model of anatomy;
a means for detecting two or more levels of pressure applied to said model during a physical examination of said model;

a means for detecting a position of each said level of pressure on said model during the examination of said model; and a means for reporting to the person said levels of pressure and said position of each said level of pressure applied by the person and recorded during the person's physical examination of said model;

wherein said means for detecting two or more levels of pressure and said means for detecting a position of each said level of pressure are external to said model; and wherein said means or detecting a position of each said level of pressure comprises arranging two or more said means for detecting two or more levels of pressure in a matrix configuration.

25. An instrumented model system for training a person on performing a physical examination, comprising:

a model of anatomy;

a means for detecting two or more levels of pressure applied to said model during a physical examination of said model;

a means for detecting a position of each said level of pressure on said model during the examination of said model; and a means for reporting to the person said levels of pressure and said position of each said level of pressure applied by the person and recorded during the person's physical examination of said model;

wherein said means br detecting two or more levels of pressure and said means for detecting a position of each said level of pressure are external to said model; and wherein said means or reporting compares the person's physical examination of said model with an expert performance table of a physical examination of a model.

26. An instrumented model system for training a person on performing a physical examination, comprising:

a model of anatomy;

a means for detecting two or more levels of pressure applied to said model during a physical examination of said model;

a means for detecting a position of each said level of pressure on said model during the examination of said model;

a means for reporting to the person said levels of pressure and said position of each said level of pressure applied by the person and recorded during the person's physical examination of said model; and a means for calibrating said means for detecting two or more levels of pressure applied to said model during a physical examination of said model and said means for detecting a position of each said level of pressure on said model during the examination of said model;

wherein said means for detecting two or more levels of pressure and said means for detecting a position of each said level of pressure are external to said model.

27. A method for training a person in giving a physical examination, comprising the steps of:

(a) placing a solid-state sensing system in contact with an external surface of a model of anatomy, creating an instrumented model system;

(b) applying pressure to one or more positions on said model;

(c) recording two or more levels of said pressure applied to said model in said step (b);

(d) recording one or more positions of said two or more levels of pressure applied to said model; and (e) displaying said two or more levels of pressure and said one or more positions of said levels of pressure to the person.

28. The method according to claim 27, further comprising the step of:

(f) providing instructional training to said person on how to perform a proper physical examination.

29. The method according to claim 27, wherein said solid-state sensing system is selected from the group consisting of a tactile sensor pad, fiber-optic based, pressure sensitive, smart fabric, pressure sensitive piezo-electric polymer materials, and capaciflectors.

30. The method according to claim 27, wherein said solid-state sensing system is placed under said model.

31. The method according to claim 27, further comprising the step of:

(f) training the person on the proper use of said instrumented model system.

32. The method according to claim 27, further comprising the step of:

(f) informing the person about a predefined disease.

33. The method according to claim 27, further comprising the step of:

(f) estimating the person's risk of getting a predefined disease.

34. The method according to claim 27, further comprising the step of:

(f) connecting a computer system to said solid-state sensing system such that said recording of two or more levels of said pressure applied to said model, said recording of one or more positions of said two or more levels of pressure applied to said model, and said displaying of said two or more levels of pressure and said one or more positions of said levels of pressure to the person are performed by said computer system.

35. The method according to claim 27, wherein one or more lumps are embedded within said model.

36. The method according to claim 27, wherein said displaying of said two or more levels of pressure and said one or more positions of said levels of pressure occurs in real time with the person performing the physical examination of said model.

37. A method for training a person in giving a physical examination, comprising the steps of:

(a) placing a solid-state sensing system in contact with an external surface of a model of anatomy, creating an instrumented model system;

(b) applying pressure to one or more positions on said model;

(c) recording two or more levels of said pressure applied to said model in said step (b);

(d) recording one or more positions of said two or more levels of pressure applied to said model; and (e) displaying said two or more levels of pressure and said one or more positions of said levels of pressure to the person;

wherein said solid-state sensing system is placed over said model.

38. A method for training a person in giving a physical examination, comprising the steps of:

(a) placing a solid-state sensing system in contact with an external surface of a model of anatomy, creating a instrumented model system;

(b) applying pressure to one or more positions on said model;

(c) recording two or more levels of said pressure applied to said model in said step (b);

(d) recording one or more positions of said two or more levels of pressure applied to said model; and (e) displaying said two or more levels of pressure and said one or more positions of said levels of pressure to the person;

wherein said solid-state sensing system is wrapped around said model.

39. A method for training a person in giving a physical examination, comprising the steps of:

(a) placing a solid-state sensing system in contact with an external surface of a model of anatomy, creating an instrumented model system;

(b) applying pressure to one or more positions on said model;

(c) recording two or more levels of said pressure applied to said model in said step (b);

(d) recording one or more positions of said two or more levels of pressure applied to said model;

(e) displaying said two or more levels of pressure and said one or more positions of said levels of pressure to the person; and (f) comparing the per one's physical examination of said model with an expert performance table of a physical examination of a model.

40. A method for training a person in giving a physical examination, comprising the steps of:

(a) placing a solid-state sensing system in contact with an external surface of a model of anatomy, creating a instrumented model system;

(b) applying pressure to one or more positions on said model;

(c) recording two or more levels of said pressure applied to said model in said step (b);

(d) recording one or more positions of said two or more levels of pressure applied to said model;

(e) displaying said two or more levels of pressure and said one or more positions of said levels of pressure to the person; and (f) calibrating said solid-state sensor system for said model.

41. An instrumented model system for training a person on performing a physical examination on a part of anatomy, comprising:

a means for detecting two or more levels of pressure applied to the part during a physical examination of the part;

a means for detecting a position of each said level of pressure on the part during the examination of the part; and a means for reporting to the person said levels of pressure and said position of each said level of pressure applied by the person and recorded during the person's physical examination of the part;

wherein said means for detecting two or more levels of pressure and said means for detecting a position of each said level of pressure are adapted to be used with the external surface of the part.

42. The instrumented model system according to claim 41, wherein the part of anatomy is selected from the group consisting of a model of anatomy and a part of patient.

43. The instrumented model system according to claim 41, wherein said means for detecting two or more levels of pressure and said means for detecting a position of each said level of pressure is a solid-state sensing system.

44. The instrumented model system according to claim 41, wherein said solid-state sensing system is selected from the group consisting of tactile sensor pad, fiber-optic based, pressure sensitive, smart fabric, pressure sensitive piezo-electric polymer materials, and capaciflectors.

45. The instrumented model system according to claim 41, further comprising a computer system in communication with said means for detecting two or more levels of pressure, said means for detecting a position of each said level of pressure, and said means for reporting said levels of pressure and said position of each said level of pressure.

46. The instrumented model system according to claim 41, further comprising a means for training the person on the proper use of the modeling system.

47. The instrumented model system according to claim 41, further comprising a means for informing the person about a predefined disease.

48. The instrumented model system according to claim 41, further comprising a means for estimating the person's risk of getting a predefined disease.

49. The instrumented model system according to claim 41, wherein said means for reporting occurs in real time with the person performing the physical examination of said part.

50. An instrumented model system for training a person on performing a physical examination on a part of anatomy, comprising:

a means for detecting two or more levels of pressure applied to the part during a physical examination of the part;

a means for detecting a position of each said level of pressure on the part during the examination of the part; an a means for reporting to the person said levels of pressure and said position of each said level of pressure applied by the person and recorded during the person's physical examination of the part;

wherein said means for detecting two or more levels of pressure and said means for detecting a position of each said level of pressure are adapted to be used with the external surface of the part; and wherein said means or reporting compares the person's physical examination of said part with an expert performance table of a physical examination of a part.

51. An instrumented model system for training a person on performing a physical examination on a part of anatomy, comprising:

a means for detecting two or more levels of pressure applied to the part during a physical examination of the part;

a means for detecting a position of each said level of pressure on the part during the examination of the part;

a means for reporting to the person said levels of pressure and said position of each said level of pressure applied by the person and recorded during the person's physical examination of the part; an a means for calibrating said means for detecting two or more levels of pressure applied to said model during a physical examination of said part and said means for detecting a position of each said level of pressure on said part during the examination of said part;

wherein said means for detecting two or more levels of pressure and said means for detecting a position of each said level of pressure are adapted to be used with the external surface of the part.

* * * * *